(12) United States Patent
Claffee et al.

(10) Patent No.: US 9,327,412 B2
(45) Date of Patent: *May 3, 2016

(54) COMPLIANT UNDERACTUATED GRASPER

(71) Applicant: iRobot Corporation, Bedford, MA (US)

(72) Inventors: Mark Claffee, Methuen, MA (US); Nicholas Roy Corson, Hollis, NH (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,410

(22) Filed: Mar. 10, 2015

(65) Prior Publication Data

US 2015/0190931 A1 Jul. 9, 2015

Related U.S. Application Data

(63) Continuation of application No. 13/833,580, filed on Mar. 15, 2013, now Pat. No. 9,004,559.

(60) Provisional application No. 61/724,506, filed on Nov. 9, 2012.

(51) Int. Cl.
*B25J 15/00* (2006.01)
*B25J 15/08* (2006.01)
*B25J 9/00* (2006.01)
(Continued)

(52) U.S. Cl.
CPC ............ *B25J 15/08* (2013.01); *B25J 9/0015* (2013.01); *B25J 9/104* (2013.01); *B25J 15/0009* (2013.01); *B25J 15/0475* (2013.01); *B25J 15/10* (2013.01);
(Continued)

(58) Field of Classification Search
CPC .......... B25J 15/08; B25J 9/0015; B25J 9/104; B25J 15/0009; B25J 15/0475; B25J 15/10; Y10S 294/907; Y10S 901/31; Y10S 901/36; Y10S 901/46
USPC .......... 294/111, 106, 213; 901/45, 31, 30, 21; 623/64
See application file for complete search history.

(56) References Cited

U.S. PATENT DOCUMENTS 3,370,213 A 2/1968 Rose
3,694,021 A 9/1972 Mullen
(Continued)

FOREIGN PATENT DOCUMENTS

JP 2001277174 A 10/2001 ............... B25J 15/08
JP 2010-036328 A 2/2010
(Continued)

OTHER PUBLICATIONS

Willow Garage 2G 'Velo' Gripper; http://www.willowgarage.com/velo2g; Aug. 8, 2014; 2 pages.
(Continued)

*Primary Examiner* — Gabriela Puig
(74) *Attorney, Agent, or Firm* — Myers Bigel Sibley, P.A.

(57) ABSTRACT

A compliant underactuated grasper includes a palm base and two fingers. Each of the fingers comprises: a proximal phalanx; a distal phalanx; a compliant flexure joint connecting the distal phalanx to the proximal phalanx; and a pin joint connecting the proximal phalanx to the palm base, the pin joint constraining angular movement of the proximal phalanx relative to the palm base to rotation about a pin pivot axis. The grasper further includes at least one actuator to move the fingers. The grasper has fewer actuators than degrees of freedom.

22 Claims, 27 Drawing Sheets

(51) Int. Cl.
  *B25J 9/10* (2006.01)
  *B25J 15/04* (2006.01)
  *B25J 15/10* (2006.01)

(52) U.S. Cl.
  CPC ............. *Y10S 294/907* (2013.01); *Y10S 901/31* (2013.01); *Y10S 901/36* (2013.01); *Y10S 901/46* (2013.01)

(56) References Cited

U.S. PATENT DOCUMENTS

| | | | |
|---|---|---|---|
| 3,927,424 A | 12/1975 | Itoh | |
| 4,246,661 A | 1/1981 | Pinson | |
| 4,351,553 A | 9/1982 | Rovetta et al. | |
| 4,364,593 A | 12/1982 | Maeda | |
| 4,600,357 A | 7/1986 | Coules | |
| 4,834,443 A | 5/1989 | Crowder et al. | |
| 4,955,918 A | 9/1990 | Lee | |
| 4,957,320 A | 9/1990 | Ulrich | |
| 4,984,951 A | 1/1991 | Jameson | |
| 5,080,681 A | 1/1992 | Erb | |
| 5,108,140 A | 4/1992 | Bartholet | |
| 5,200,679 A | 4/1993 | Graham | |
| 5,280,981 A | 1/1994 | Schulz | 294/106 |
| 5,447,403 A | 9/1995 | Engler, Jr. | |
| 5,501,498 A | 3/1996 | Ulrich | 294/106 |
| 5,570,920 A | 11/1996 | Crisman et al. | |
| 5,762,390 A | 6/1998 | Gosselin et al. | |
| 5,947,539 A | 9/1999 | Long et al. | 294/119.1 |
| 6,517,132 B2 | 2/2003 | Matsuda et al. | |
| 6,918,622 B2 | 7/2005 | Kim et al. | |
| 7,168,748 B2 | 1/2007 | Townsend et al. | |
| 7,258,379 B2 | 8/2007 | Ono et al. | 294/119.3 |
| 7,259,338 B2 | 8/2007 | Hayakawa et al. | |
| 7,407,208 B2 | 8/2008 | Tadano | |
| 7,654,595 B2 | 2/2010 | Yokoyama et al. | 294/99.1 |
| 8,231,158 B2 | 7/2012 | Dollar et al. | |
| 8,442,678 B2 | 5/2013 | Ichikawa et al. | |
| 8,483,880 B2 | 7/2013 | de la Rosa Tames et al. | |
| 8,549,952 B2 | 10/2013 | Matsukuma et al. | |
| 8,585,111 B2 | 11/2013 | Nammoto et al. | 294/106 |
| 8,660,695 B2 | 2/2014 | de la Rosa Tames et al. | |
| 8,936,290 B1 * | 1/2015 | Salisbury | B25J 19/065 294/111 |
| 9,039,057 B2 * | 5/2015 | Schvalb | A61F 2/586 294/106 |
| 2001/0028174 A1 | 10/2001 | Matsuda et al. | |
| 2005/0040663 A1 | 2/2005 | Kameda et al. | |
| 2005/0121929 A1 | 6/2005 | Greenhill et al. | |
| 2005/0218679 A1 | 10/2005 | Yokoyama et al. | |
| 2006/0131908 A1 | 6/2006 | Tadano | 294/111 |
| 2009/0302626 A1 | 12/2009 | Dollar et al. | 294/106 |
| 2009/0317223 A1 | 12/2009 | Schoenfeld et al. | |
| 2010/0139437 A1 | 6/2010 | Ichikawa et al. | |
| 2011/0040408 A1 | 2/2011 | de la Rosa Tames et al. | |
| 2012/0205933 A1 | 8/2012 | Dai | |
| 2013/0152724 A1 | 6/2013 | Mozelka et al. | 74/490.05 |
| 2013/0245823 A1 | 9/2013 | Kimura et al. | 700/248 |
| 2014/0035306 A1 | 2/2014 | Garcia et al. | 294/213 |

FOREIGN PATENT DOCUMENTS

| | | | | |
|---|---|---|---|---|
| KR | 20110005146 A | 1/2011 | | B25J 1/00 |
| WO | WO 00/69375 A1 | 11/2000 | | |

OTHER PUBLICATIONS

Grifantini, Kristina "A Simpler, Gentler Robotic Grip"; MIT Technology Review; http://www.technologyreview.com/news/415477/a-simpler-gentler-robotic-grip; Sep. 28, 2009; 4 pages.

International Search Report Corresponding to International Application No. PCT/US2013/069182; Date of Mailing: Jan. 21, 2014 (16 pgs).

* cited by examiner

COMPLIANT UNDERACTUATED GRASPER

RELATED APPLICATION(S)

The present application is a continuation application of and claims priority from U.S. patent application Ser. No. 13/833,580, filed Mar. 15, 2013, which claims the benefit of and priority from U.S. Provisional Patent Application No. 61/724,506, filed Nov. 9, 2012, the disclosures of which are incorporated herein by reference in their entireties.

STATEMENT OF GOVERNMENT SUPPORT

This invention was made with support under Defense Advanced Research Projects Agency (DARPA) Contract No. W91CRB-10-C-0141 awarded by DARPA for the DARPA Autonomous Robot Manipulation-Hardware Track (ARM-H). The Government has certain rights in the invention.

BACKGROUND OF THE INVENTION

End effectors or graspers are commonly mounted on a robotic arm and used to manipulate and/or grasp objects in a selected environment. The environment may be structured or unstructured.

SUMMARY OF THE INVENTION

According to embodiments of the present invention, a compliant underactuated grasper includes a palm base and two fingers. Each of the fingers comprises: a proximal phalanx; a distal phalanx; a compliant flexure joint connecting the distal phalanx to the proximal phalanx; and a pin joint connecting the proximal phalanx to the palm base, the pin joint constraining angular movement of the proximal phalanx relative to the palm base to rotation about a pin pivot axis. The grasper further includes at least one actuator to move the fingers. The grasper has fewer actuators than degrees of freedom.

The grasper may further include a pin joint angle sensor associated with each finger.

The grasper may further include a rotation joint connecting each finger to the palm base, wherein the finger can be rotated relative to the palm base about the rotation joint to reorient its pin pivot axis with respect to the palm base.

In some embodiments, the grasper further includes a thumb and at least one actuator to move the thumb independently of the fingers. The thumb includes: a proximal phalanx; a distal phalanx; a compliant flexure joint connecting the distal phalanx to the proximal phalanx; and a pin joint connecting the proximal phalanx to the palm base, the pin joint constraining angular movement of the proximal phalanx relative to the palm base to rotation about a pin pivot axis.

According to embodiments of the present invention, a compliant underactuated grasper includes a palm base and two fingers. Each of the fingers includes: a proximal phalanx; a distal phalanx; a compliant flexure joint connecting the distal phalanx to the proximal phalanx; a pin joint connecting the proximal phalanx to the palm base, the pin joint having a dominant degree of freedom about a pin pivot axis; and a tendon cable for moving the proximal and distal phalanges such that movement of the tendon cable generates angular motion of the proximal phalanx about the pin pivot axis at a greater rate than angular motion of the distal phalanx about the flexure joint. The grasper further includes at least one actuator to move the fingers. The grasper has fewer actuators than degrees of freedom.

In some embodiments, the flexure joint includes a flexure link formed of a compliant elastomeric material.

According to some embodiments, the pivot joint connects the proximal phalanx to the palm base for rotation about the pivot joint in a first direction and a second direction, the grasper includes a return biasing spring to drive the proximal phalanx in the second direction to a return position, the return biasing spring has a first spring rate, the flexure joint is configured to bias the distal phalanx into an open position relative to the proximal phalanx and has a second spring rate, and the second spring rate is greater than the first spring rate. In some embodiments, the second spring rate is at least eight times the first spring rate. In some embodiments, the first spring rate is sufficient to retain the proximal phalanx in the return position in any orientation of the grasper with the tendon cable slack, and the second spring rate is sufficient to retain the distal phalanx in the open position in any orientation of the grasper with the tendon cable slack.

According to embodiments of the present invention, a compliant underactuated grasper includes a palm base and two fingers. Each of the fingers includes: a proximal phalanx; a distal phalanx; a compliant flexure joint connecting the distal phalanx to the proximal phalanx; a pivot joint connecting the proximal phalanx to the palm base for rotation about the pivot joint in a first direction and a second direction; a tendon cable for moving the proximal phalanx in the first direction; a return biasing spring to drive the proximal phalanx in the second direction to a return position, wherein the spring rate of the return biasing spring is sufficient to retain the proximal phalanx in the return position in any orientation of the grasper with the tendon cable slack. The grasper further includes at least one actuator associated with each tendon cable. The grasper has fewer actuators than degrees of freedom.

In some embodiments, the return biasing spring includes a torsion spring.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

Figure 1:
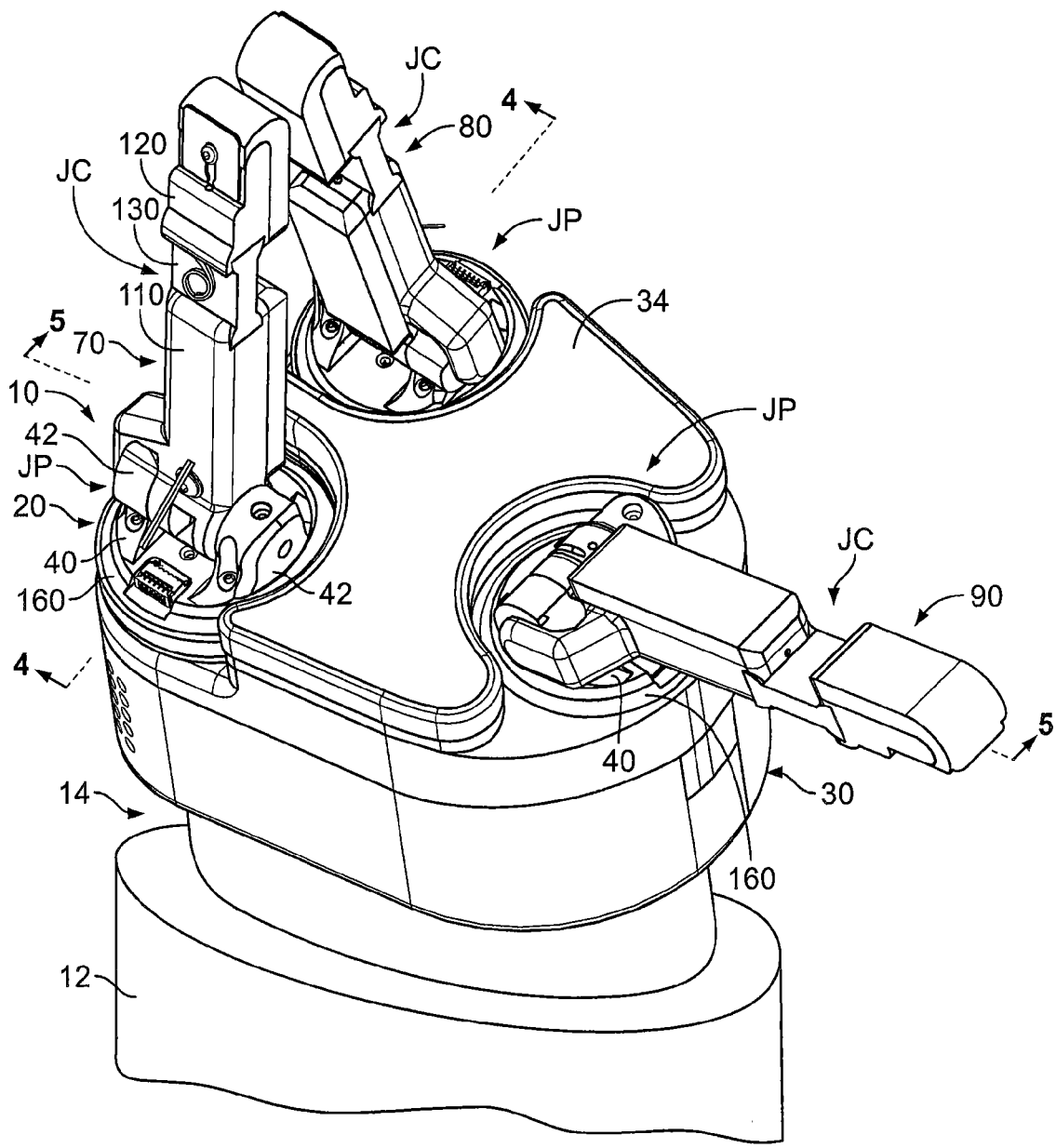
FIG. 1 is a fragmentary, perspective view of a robot including a grasper according to embodiments of the invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention are directed to end effectors or graspers. A grasper as disclosed herein may form part of a robot or a prosthetic apparatus. In particular, the grasper may be mounted on a robotic arm and used to manipulate and grasp objects in a structured or unstructured environment. The grasper may be employed as a grasper or "hand" of a humanoid robot and/or may comply with the criteria specified under the DARPA Autonomous Robot Manipulation Hardware (ARM-H) program.

With reference to the figures, a robot 10 (FIG. 1) according to embodiments of the invention is shown therein and includes an arm 12 and a grasper 20 rotatably coupled to the arm 12 by a wrist joint 14.

Figure 4:
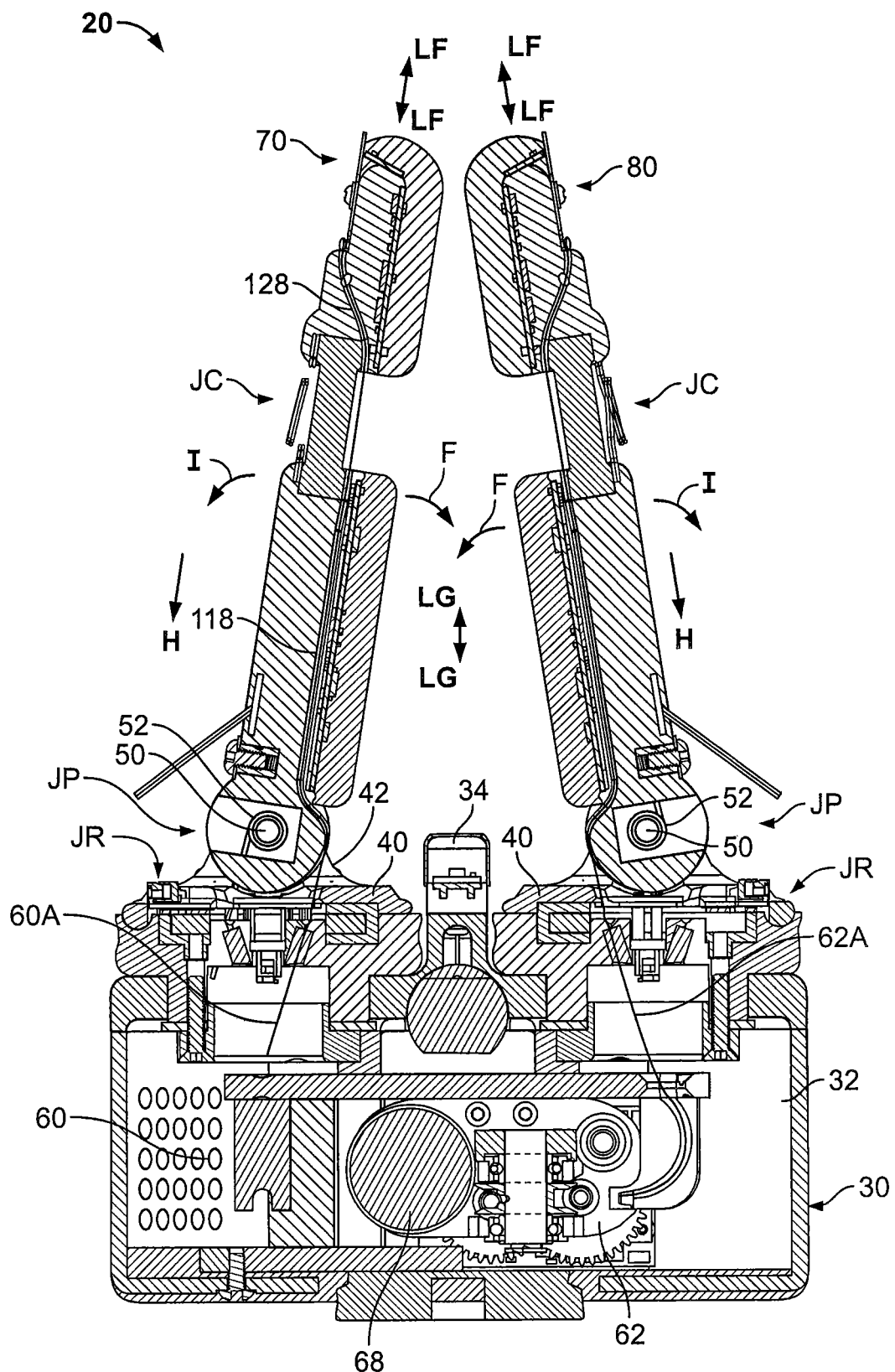
FIG. 4 is a cross-sectional view of the grasper of FIG. 1 taken along the line 4-4 of FIG. 1.

The grasper 20 includes a base assembly 30, a first finger 70, a second finger 80, and a thumb 90. The fingers 70, 80 and the thumb 90 may be identically constructed except for their placement on the base 30 and methods and mechanisms of actuation as discussed below. Except as otherwise noted, "finger" and "fingers" also refer to the thumb 90. The grasper 20 has a primary or longitudinal axis LG-LG (FIG. 4).

Figure 5:
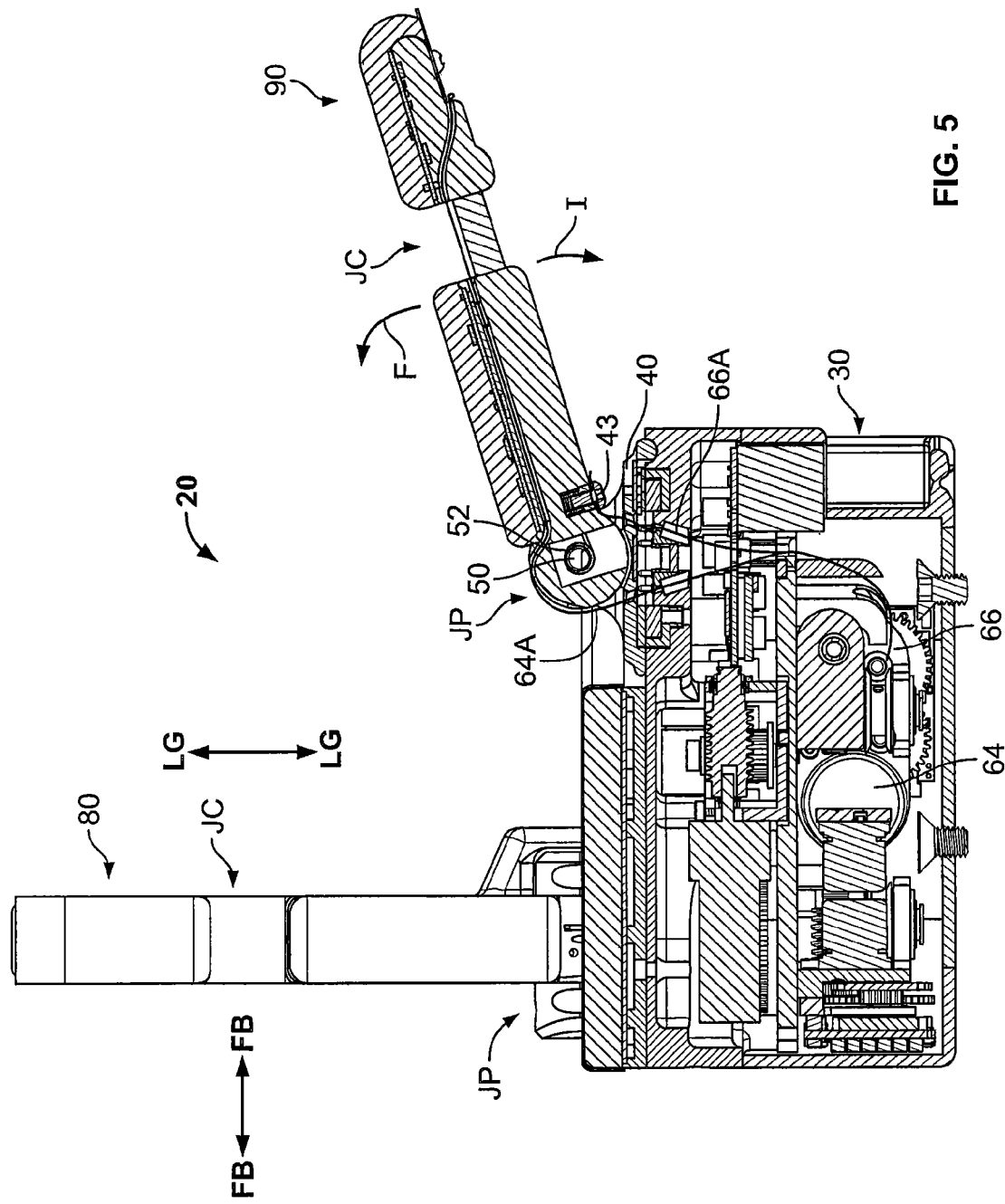
FIG. 5 is a cross-sectional view of the grasper of FIG. 1 taken along the line 5-5 of FIG. 1.
Figure 8:
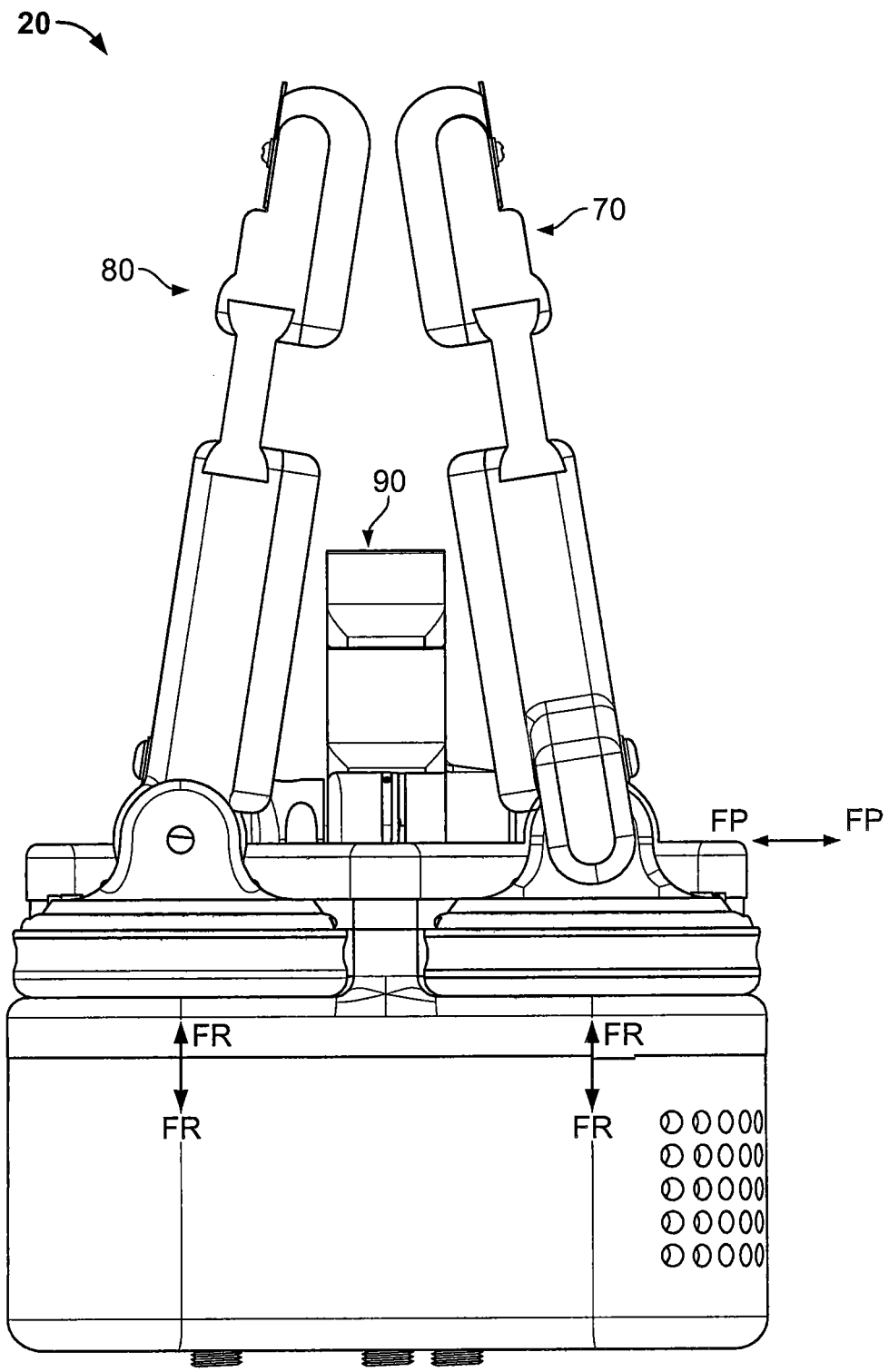
FIG. 8 is a rear elevational view of the grasper of FIG. 1.

The base 30 includes a first finger actuator 60, a second finger actuator 62, a thumb agonist actuator 64, a thumb antagonist actuator 66, and a finger rotation actuator 68. The actuators 60, 62, 64, 66, 68 may be electric motors (e.g., DC motors). Tendon cables 60A and 62A (FIG. 4) are connected to the fingers 70 and 80, respectively, to cause controlled movement of the fingers 70 and 80 using the actuators 60 and 62. Tendon cables 64A, 66A (FIG. 5) are connected to the thumb 90 to cause controlled movement of the thumb 90 using the actuators 64 and 66, respectively. Each of the fingers 70, 80, 90 can be pivoted at a respective proximal pin pivot joint JP about an axis FP-FP (FIG. 2) by the tendons 60A, 62A, 64A, 66A and the actuators 60, 62, 64, 66. Additionally, the fingers 70 and 80 can be rotated at respective rotation joints JR about rotation axes FR-FR (FIG. 8) in opposed directions K by the actuator 68. The fingers 70 and 80 are coupled by a linkage so that they rotate about the joints JR in tandem in opposite directions from each other. Each finger 70, 80, 90 can also be bent about a distal compliant flexure joint JC (FIG. 1) as described below.

Figure 15:
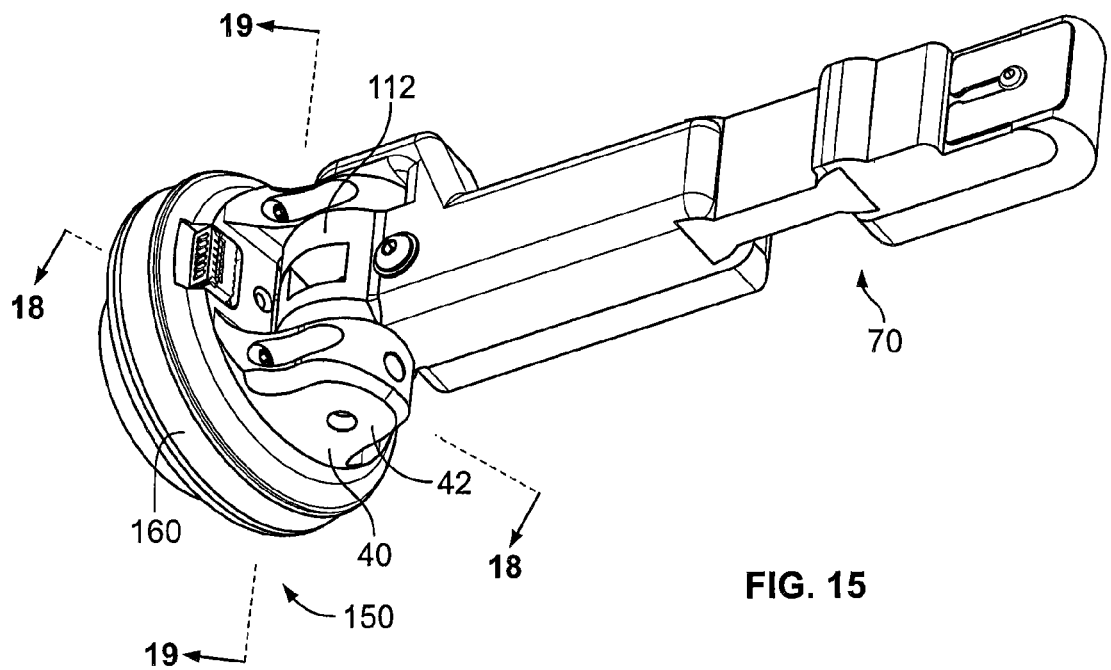
FIG. 15 is a top perspective view of the finger of FIG. 9 and an associated magnetic breakaway system.
Figure 16:
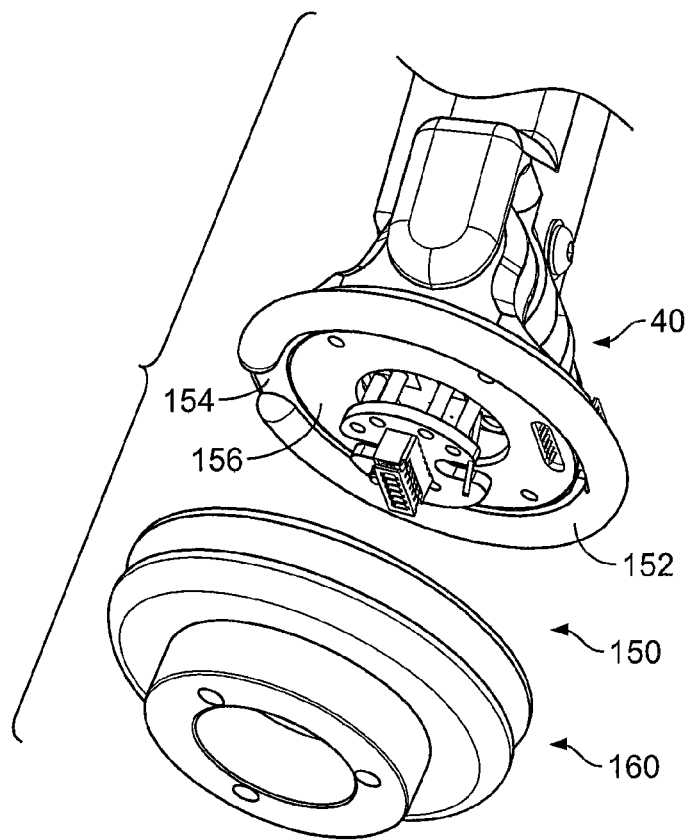
FIG. 16 is an exploded, fragmentary, bottom perspective view of the finger and magnetic breakaway system of FIG. 15.
Figure 17:
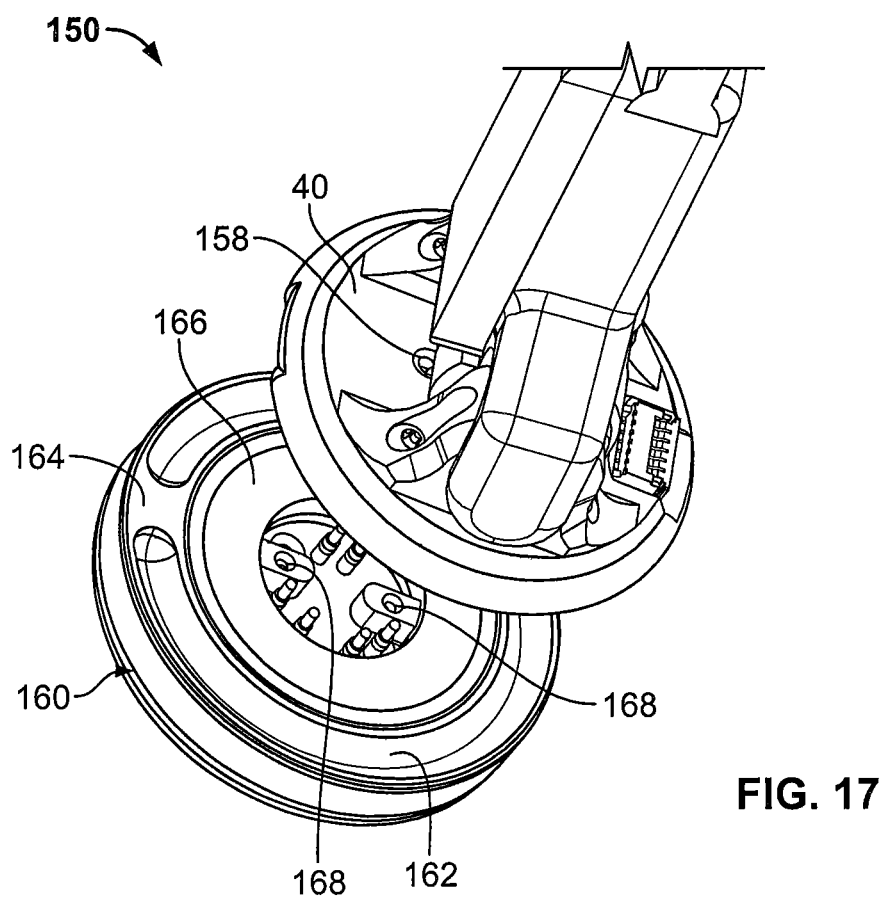
FIG. 17 is an exploded, fragmentary, top perspective view of the finger and magnetic breakaway system of FIG. 15.
Figure 18:
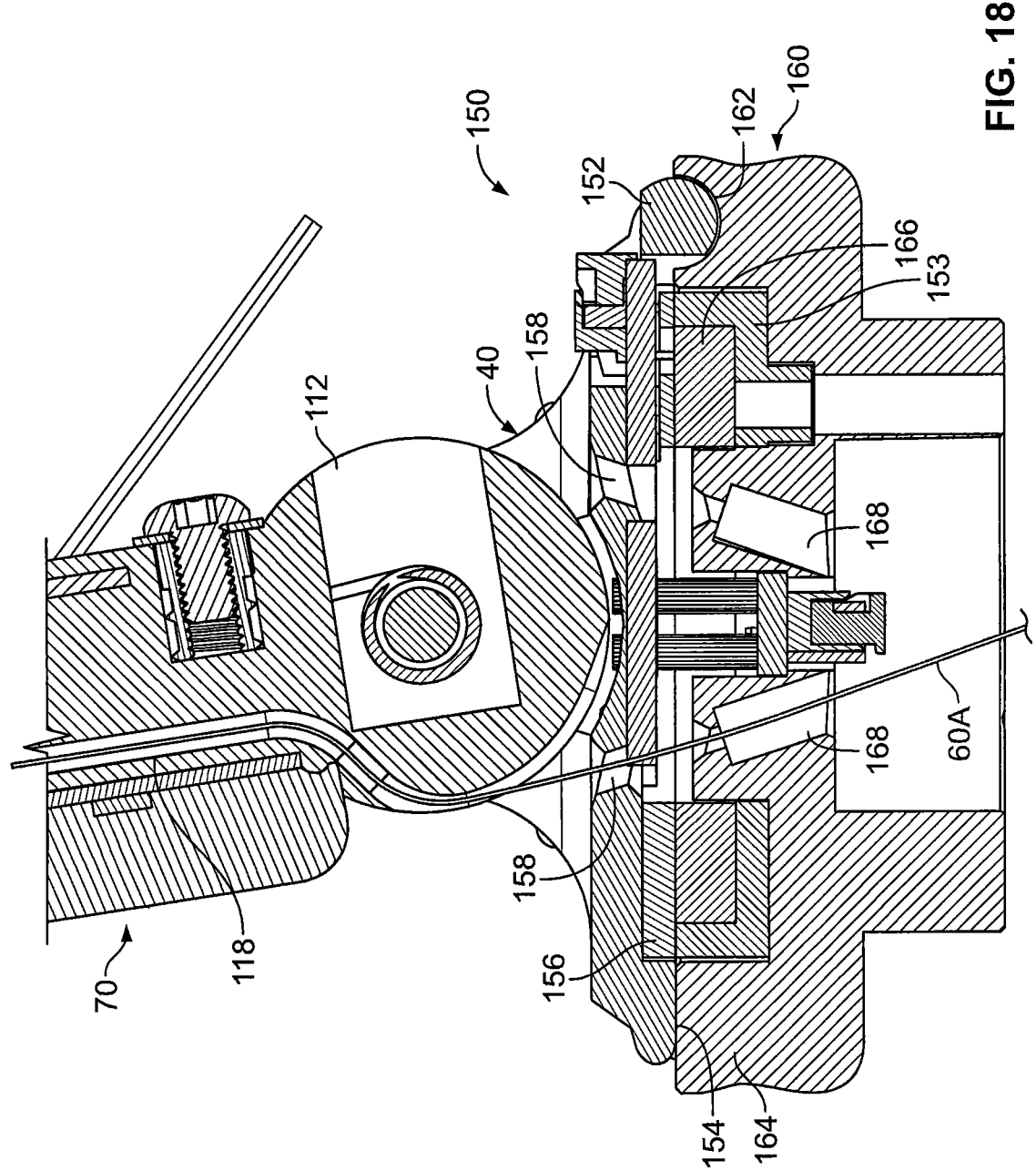
FIG. 18 is a cross-sectional view of the magnetic breakaway system of FIG. 15 taken along the line 18-18 of FIG. 15.
Figure 19:
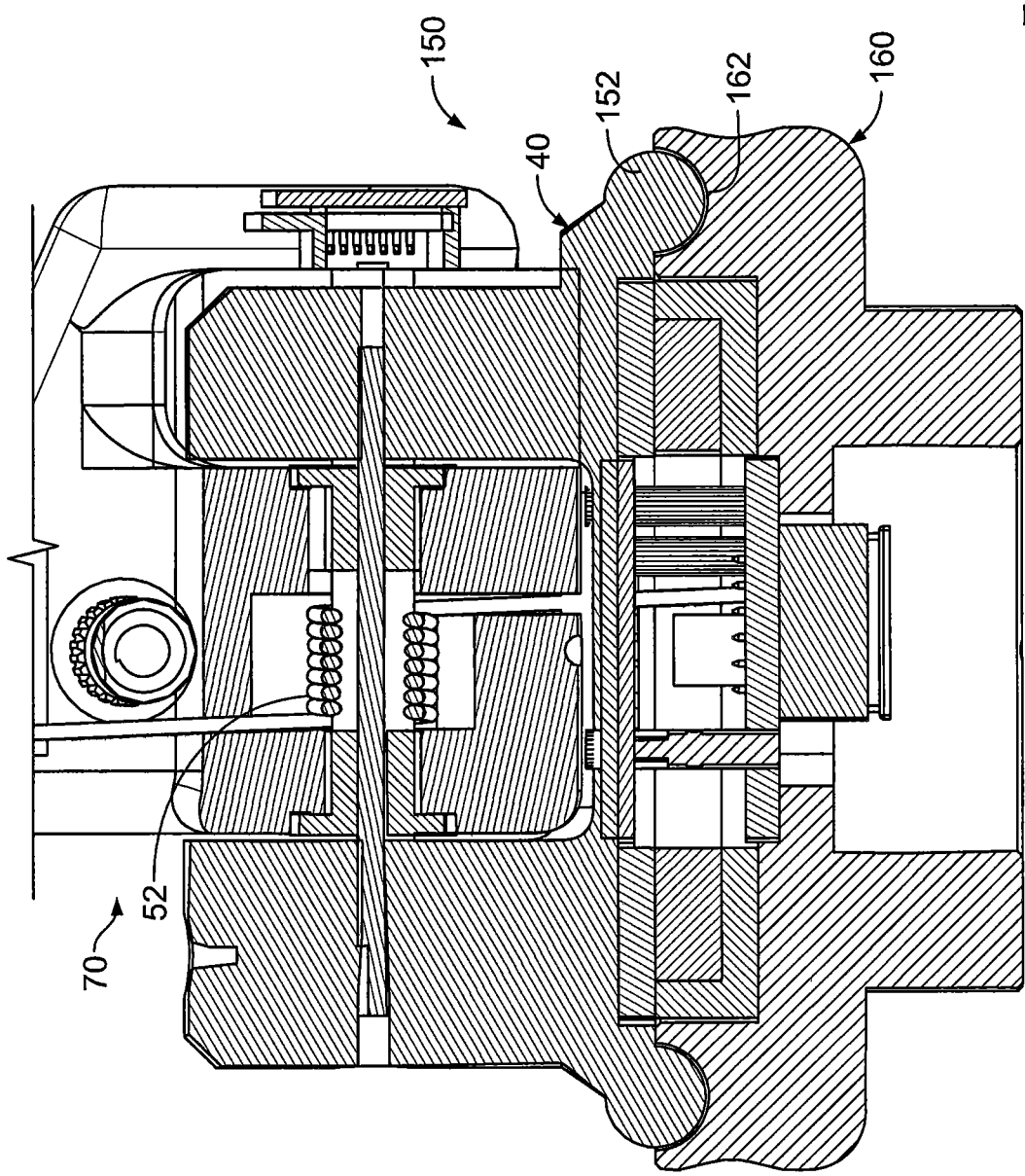
FIG. 19 is a cross-sectional view of the magnetic breakaway system of FIG. 15 taken along the line 19-19 of FIG. 15.
Figure 20:
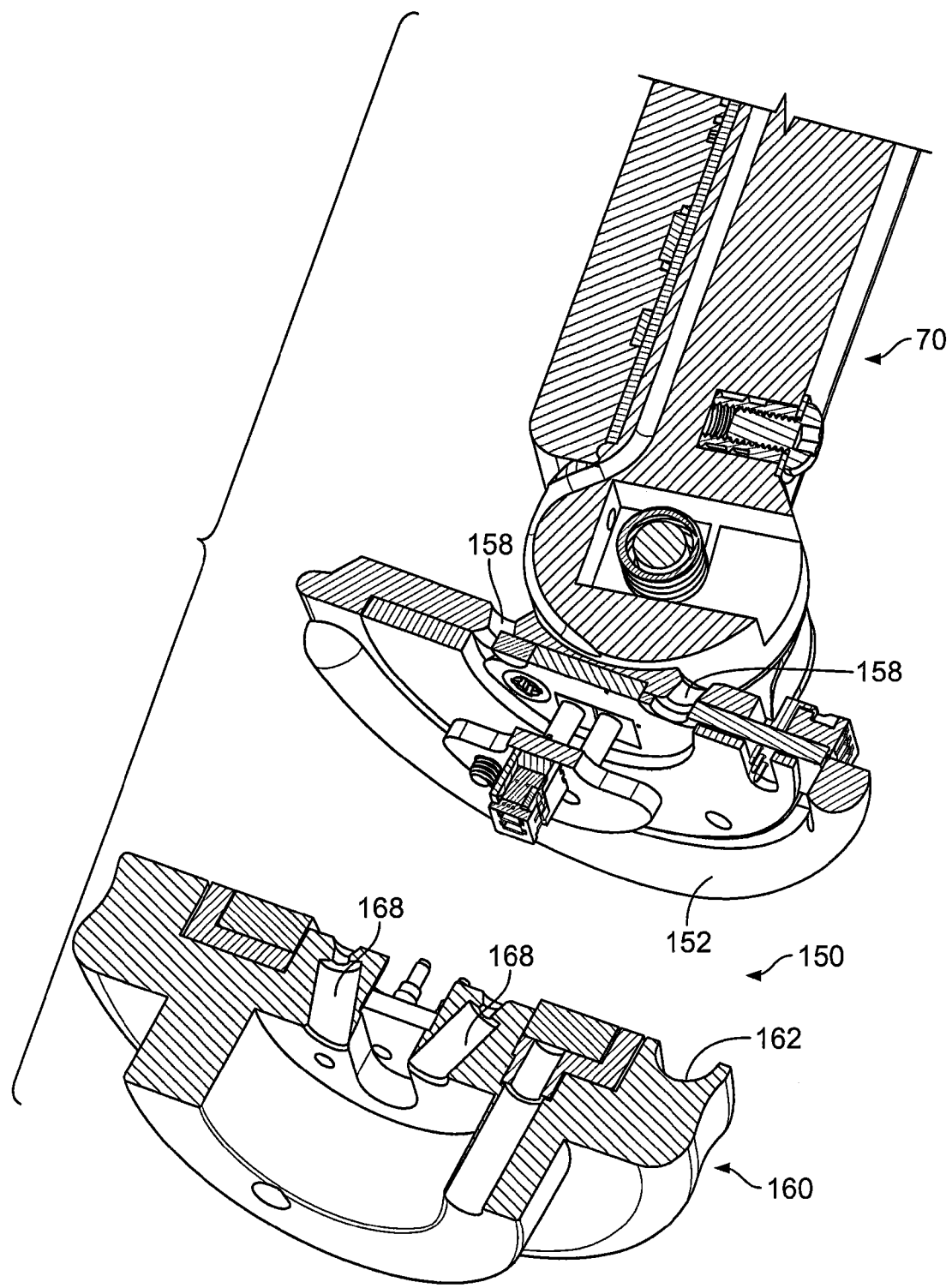
FIG. 20 is an exploded, fragmentary, cross-sectional, bottom perspective view of the magnetic breakaway system of FIG. 15.
Figure 21:
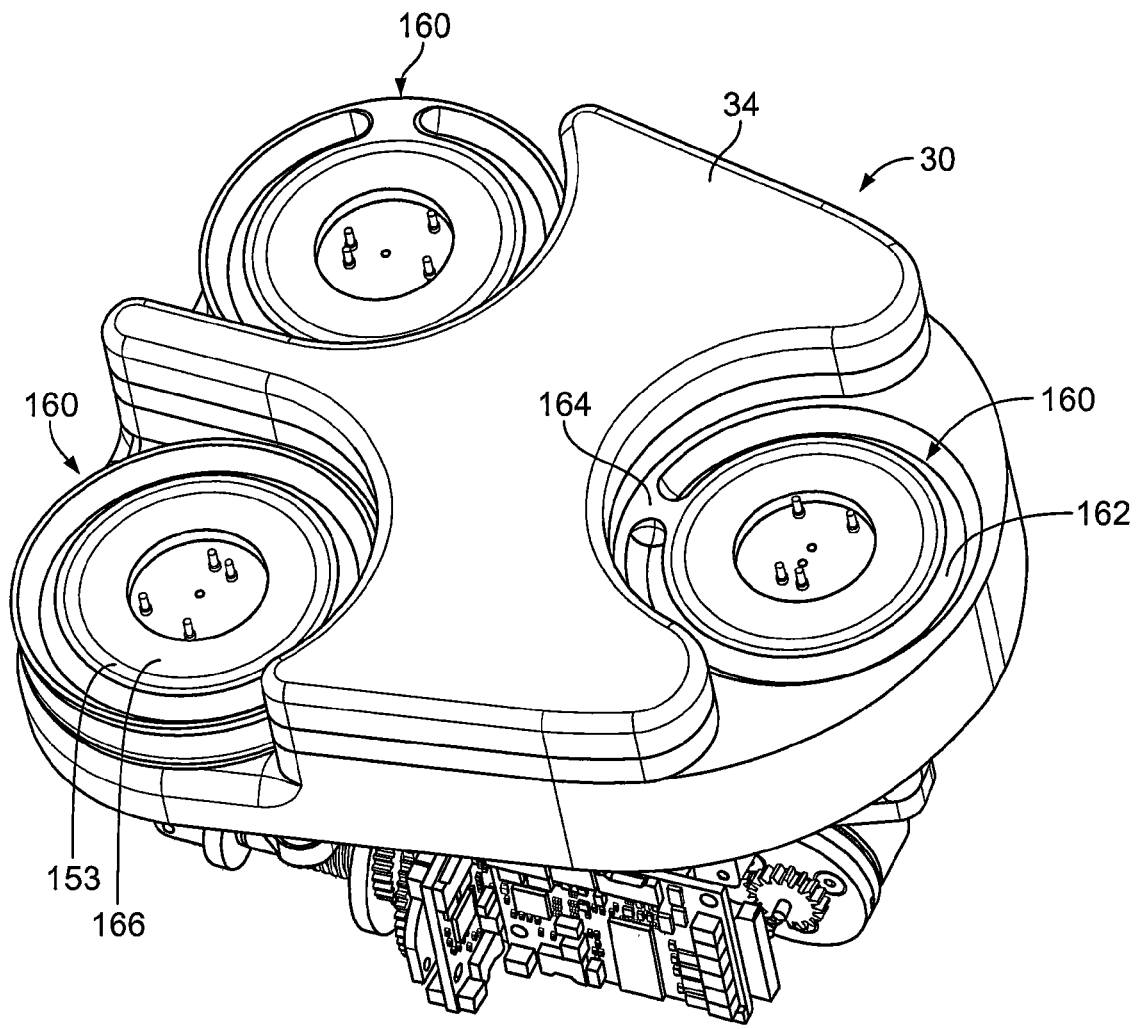
FIG. 21 is a top perspective view of a base forming a part of the grasper of FIG. 1 including submounts forming a part of the magnetic breakaway system.

The base assembly 30 includes a frame 32 and a palm 34 on an operational side of the frame 32. Three magnet base submounts 160 are mounted in the frame 32 and three associated finger base submounts 40 are mounted thereon (FIG. 15). During normal operation, each submount 160 and its associated submount 40 are coupled to function effectively as a single unit. The submounts 160 of the fingers 70 and 80 are rotatable at the joints JR.

The fingers 70, 80, 90 may be identically or similarly constructed as discussed above. An exemplary finger 70 will be described, and it will be appreciated that this description will likewise apply to the other fingers 80 and 90.

With reference to FIGS. 9-14, the finger 70 includes a proximal phalanx 110 and a distal phalanx 120 coupled by a compliant flexure link 130 at a compliant distal inter-phalanges flexure joint JC. The finger 70 also has a hinge feature 112 coupling the finger 70 to its finger base mount 40. The finger 70 has a longitudinal axis LF-LF. More particularly, the proximal phalanx 110 has a proximal end 110A and a distal end 110B. The distal phalanx 120 has a proximal end 120A and a distal end 120B. The hinge feature 112 is provided on the end 110A. The flexure link 130 is secured to the ends 110B and 120A. The end 120B is free. A distal extension or plate member 140 is mounted on the end 120B.

The hinge feature 112 is pivotally coupled to a cooperating hinge feature 42 (FIG. 1) on the finger base submount 40 by a pivot pin 50, which defines the pin pivot axis FP-FP, to form the proximal pin pivot joint JP. Rotational movement of the finger 70 about the pivot joint JP is constrained to pivoting about the pivot axis FP-FP in a finger closing pivot direction F and a finger opening pivot direction H. The finger 70 defines a finger lateral plane E parallel to each of the longitudinal axis LF-LF and the pivot axis FP-FP. It will be appreciated that the orientation of the pivot axis FP-FP will vary depending on the rotational position of the submount 40 about the axis FR-FR.

In one embodiment, an angle position sensor 54 disposed in the joint JP detects the angular position of the phalanx 110 with respect to the base 30. For example, a magnetic encoder may be mounted on one part of the joint JP (e.g., the hinge feature 42, and a cooperating magnet may be mounted on another part of the joint JP (e.g., the hinge feature 112).

Figure 7:
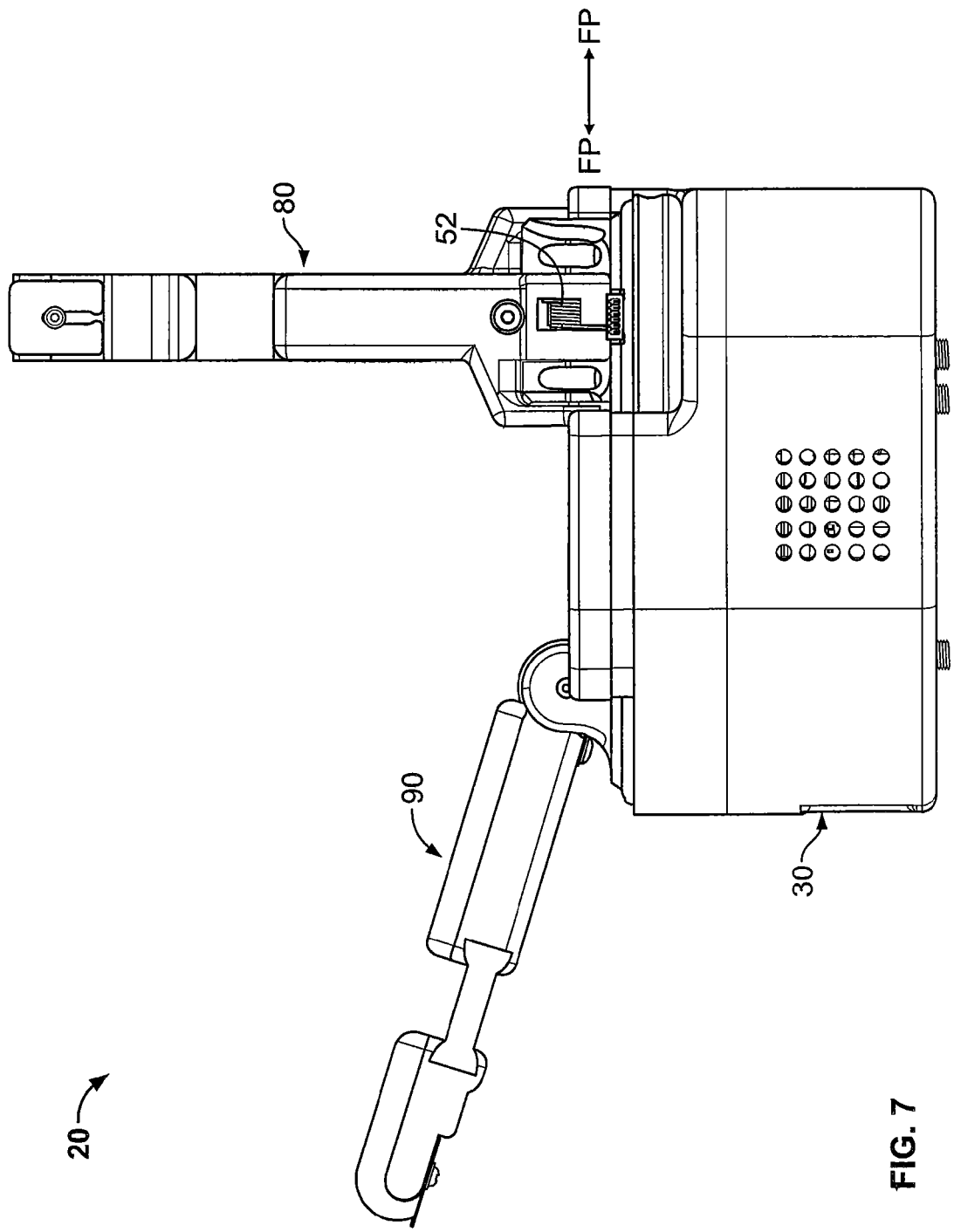
FIG. 7 is a side elevational view of the grasper of FIG. 1.

A biasing member 52 (FIGS. 4 and 7) is provided in the joint JP. According to some embodiments, the biasing member 52 is a torsion spring and, in particular, may be a helical torsion spring. The torsion spring 52 serves as a counter spring or bias return spring. In the absence of restraint from a tendon cable or external force, the torsion spring 52 will force the finger 70 to pivot in a direction I to a wide-open position.

Figure 9:
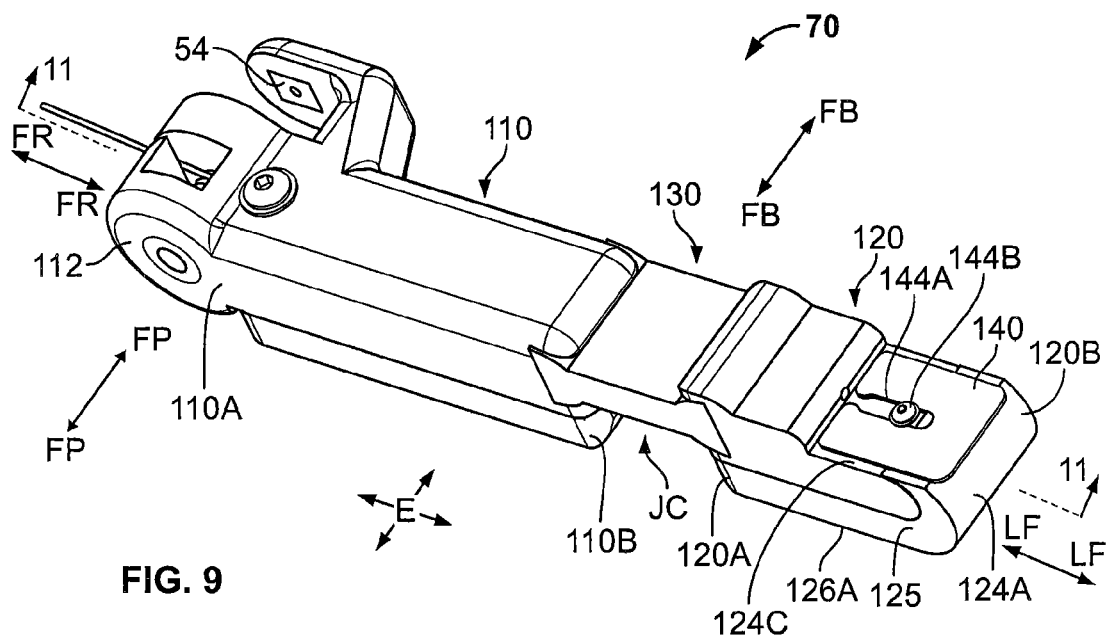
FIG. 9 is a top perspective view of a finger forming a part of the grasper of FIG. 1.
Figure 10:
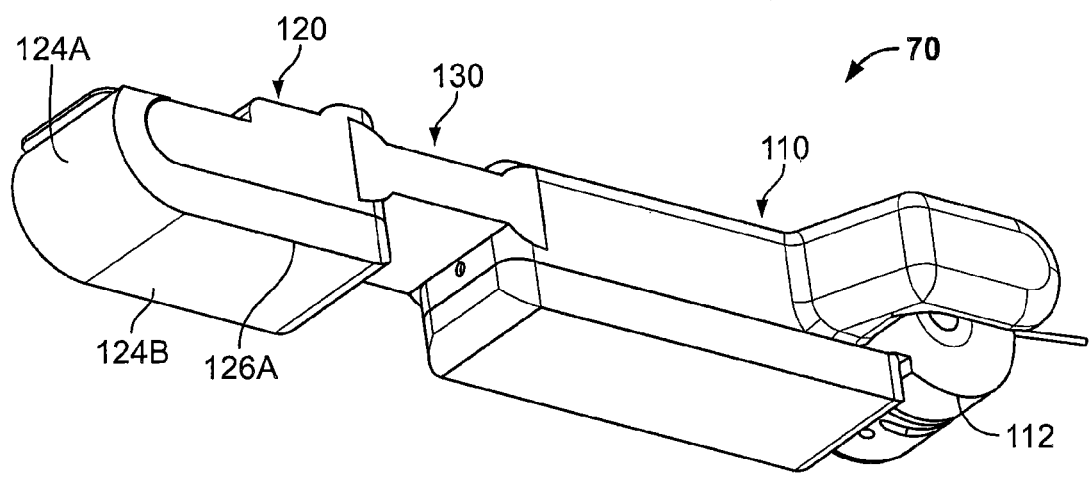
FIG. 10 is a bottom perspective view of the finger of FIG. 9.
Figure 11:
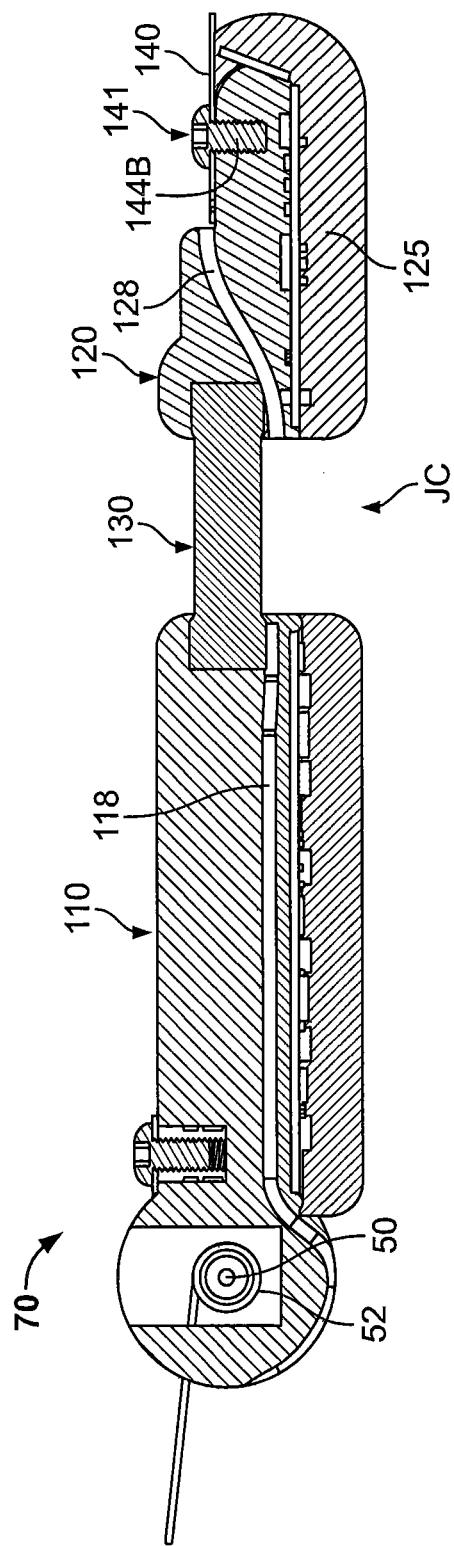
FIG. 11 is a cross-sectional view of the finger of FIG. 9 taken along the line 11-11 of FIG. 9.
Figure 12:
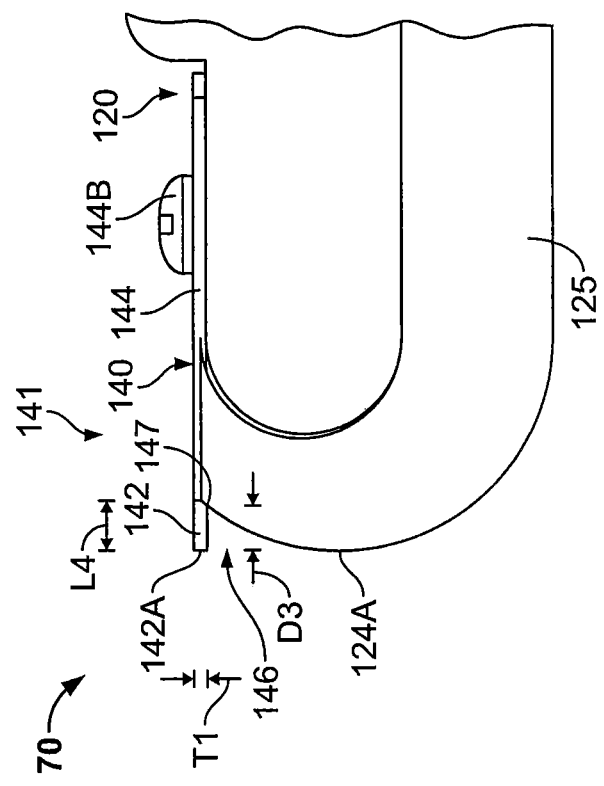
FIG. 12 is an enlarged, fragmentary, side view of the finger of FIG. 9.
Figure 13:
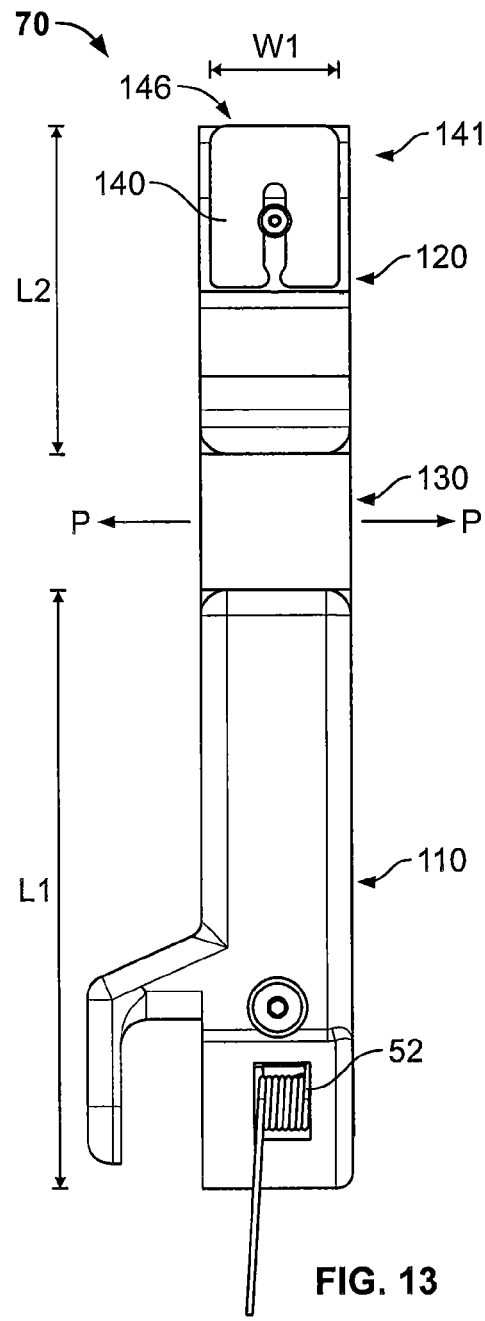
FIG. 13 is a top plan view of the finger of FIG. 9.
Figure 14:
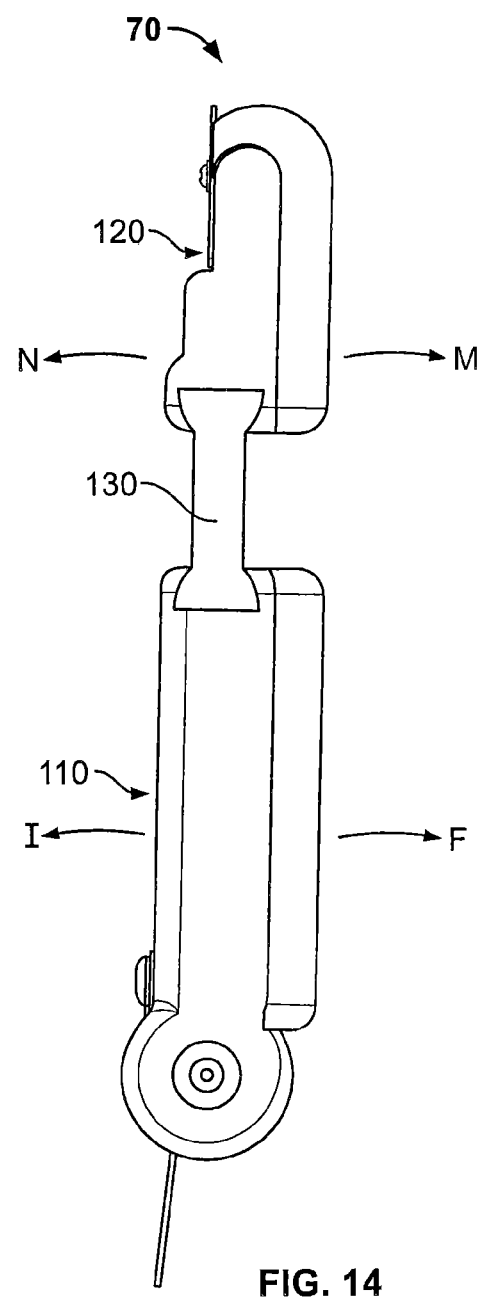
FIG. 14 is a side view of the finger of FIG. 9.

The flexure link 130 is semi-rigid, flexible, resilient and compliant. In some embodiments, the flexure link 130 is formed of an elastomeric material. The flexure link 130 flexes or bends preferentially about a distal or flexure joint pivot axis FB-FB in each of an inward, primary direction M and an outward direction N. The flexure link 130 can also flex or bend in opposed sideward or lateral, secondary directions P perpendicular to or transverse to the finger closing direction F. Thus, the flexure link 130 and the joint JC have a first compliance in a first direction M and a second compliance in a second direction P. The second direction P is perpendicular or transverse to the tendon cable retraction direction H. The first compliance is greater than the second compliance (i.e., less force is required to deflect the flexure link 130 in the first direction). When relaxed and nonloaded, the flexure link 130 will elastically return to a relaxed position or state as shown in FIGS. 9-11. According to some embodiments, the proximal phalanx 110 and the distal phalanx 120 are substantially parallel or co-axial when the flexure link 130 is in its return position.

The tendon cable 60A is routed from the actuator 60, through tendon raceways 158, 168 in the submounts 40, 160, along the inner side of the hinge feature 112, through a tendon raceway 118 in the proximal phalanx 110, across the flexure joint JC, and through a raceway 128 in the distal phalanx 120, and is anchored to the distal phalanx 120 (e.g., in the raceway 128). The actuator 60 can draw the tendon cable 60A through the raceways 118, 158, 168 in a direction H to pivot the finger 70 in the closing direction F. The actuator 60 can then release or pay out the tendon cable 60A in the opposite direction to permit the finger 70 to pivot in the opening direction I under the torque of the torsion spring 52.

Operation of the finger 70 (and corresponding operation of the finger 80 and the thumb 90) will now be discussed in further detail. With the finger 70 in the fully open position (FIG. 23), the actuator 60 draws the tendon cable 60A. The spring force or resistance from the torsion spring 52 is less than the stiffness or spring force or bend resistance of the flexure link 130. Therefore, assuming the proximal phalanx 110 does not encounter external resistance, as the tendon cable 60A applies tension load to the finger 70, the finger 70 will be displaced primarily about the pin pivot JP and secondarily about the flexure joint JC. That is, the proximal phalanx 110 will pivotally rotate a greater angular distance about the pivot pin axis FP-FP than the distal phalanx 120 pivotally rotates or bends about the flexure joint axis FB-FB.

If and when the proximal phalanx 110 is impeded by an external object (e.g., an object grasped) or strikes a limit (e.g., bottoms out on the base 30), a greater portion or all of the tension load of the tendon cable 60A will be applied to the flexure joint JC, and the distal phalanx 120 will then bend or rotate about the flexure joint axis FB-FB at a greater rate than the rate at which the proximal phalanx 110 rotates about the pin pivot axis FP-FP.

The differential rate of displacement of the phalanges 110 and 120 about their respective pivot axes will depend on the relative effective spring forces of the torsion spring 52 and the flexure link 130. According to some embodiments, the spring force of the flexure joint JC is at least 8 times the spring force of the pin pivot joint JP and, in some embodiments, is in the range of from about 8 to 12 times the spring force of the pin pivot joint JP. In some embodiments the spring rate of the torsion spring 52 is great enough to fully counteract the force of gravity on the finger 70 in any intended orientation when the grasper 20 is static and not acted on by an external object. According to some embodiments, the spring force of the torsion spring 52 is between about 100 and 150 percent of the minimum force necessary to fully counteract the force of gravity on the finger 70 in any intended orientation when the grasper 20 is static and not acted on by an external object. By minimizing the torsion spring force, the designer can reduce the required spring rate of the flexure joint JC. In turn, the return forces that the actuator 60 must overcome are reduced.

Notably, the spring force of the flexure joint JC can be as high as desired and/or needed. In particular, the spring force of the flexure joint JC may be increased as the grasper is scaled up in size and used to lift larger and heavier objects.

FIGS. 1 and 23-29 show various configurations of the fingers 70, 80, 90 that can be assumed or executed by the grasper 20.

Figure 23:
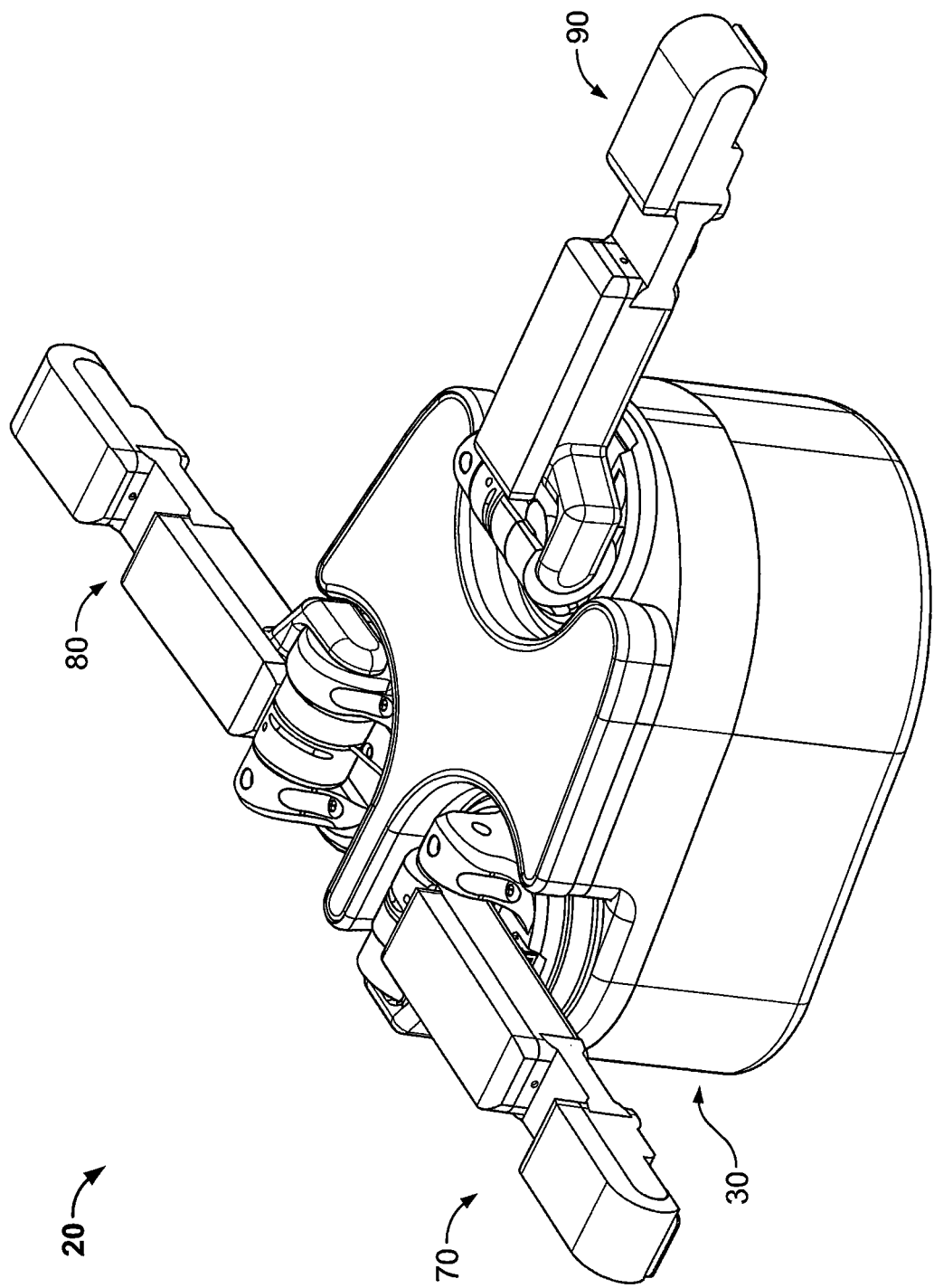
FIGS. 23-29 illustrate various finger configurations that can be executed by the grasper of FIG. 1.

FIG. 23 shows a wide open or ready position, wherein the tendon cables 60A, 62A, 64A are slack, permitting the torsion springs 52 to force each finger 70, 80, 90 to its limit in its open direction.

Figure 2:
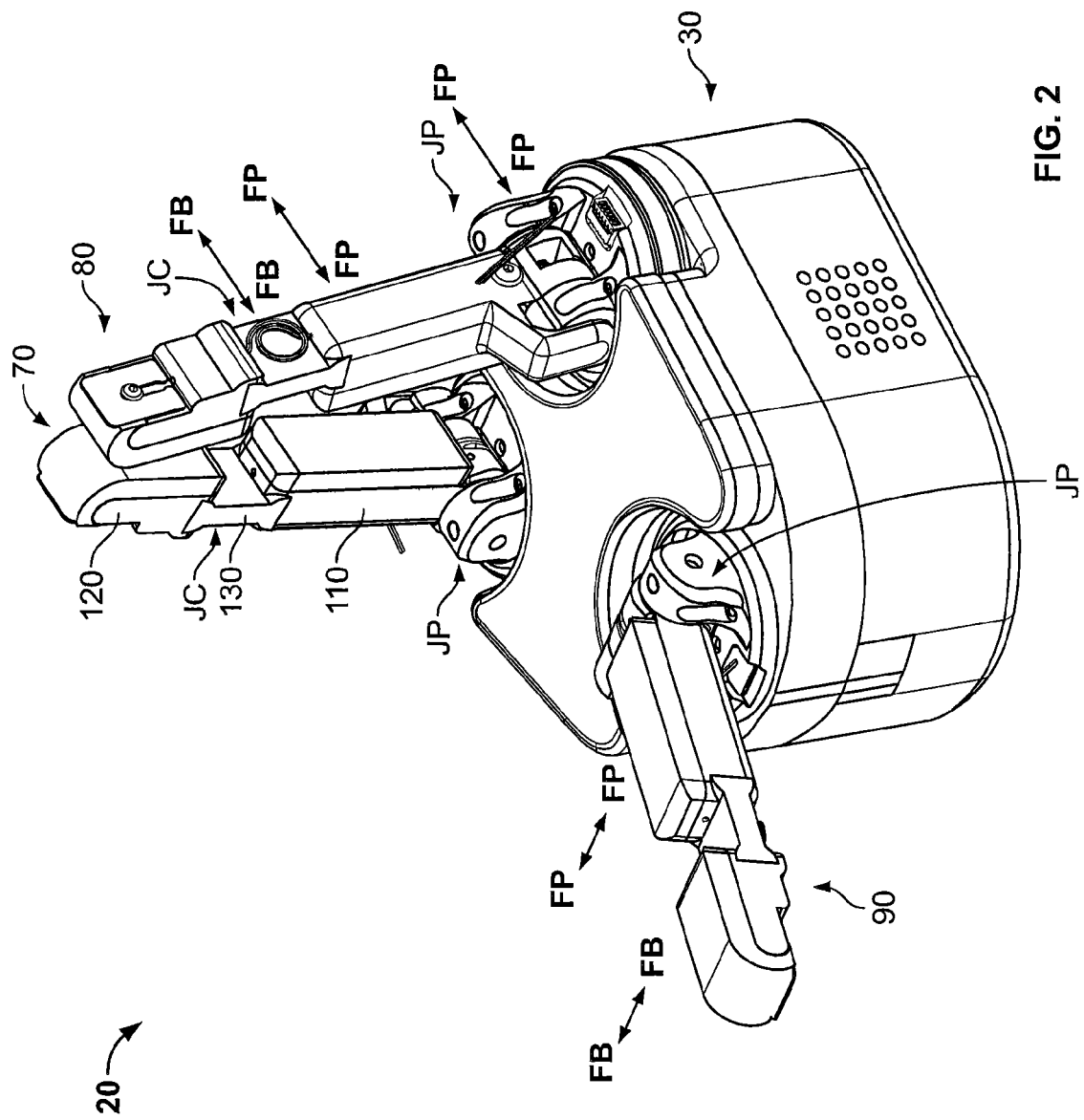
FIG. 2 is a front perspective view of the grasper of FIG. 1.
Figure 3:
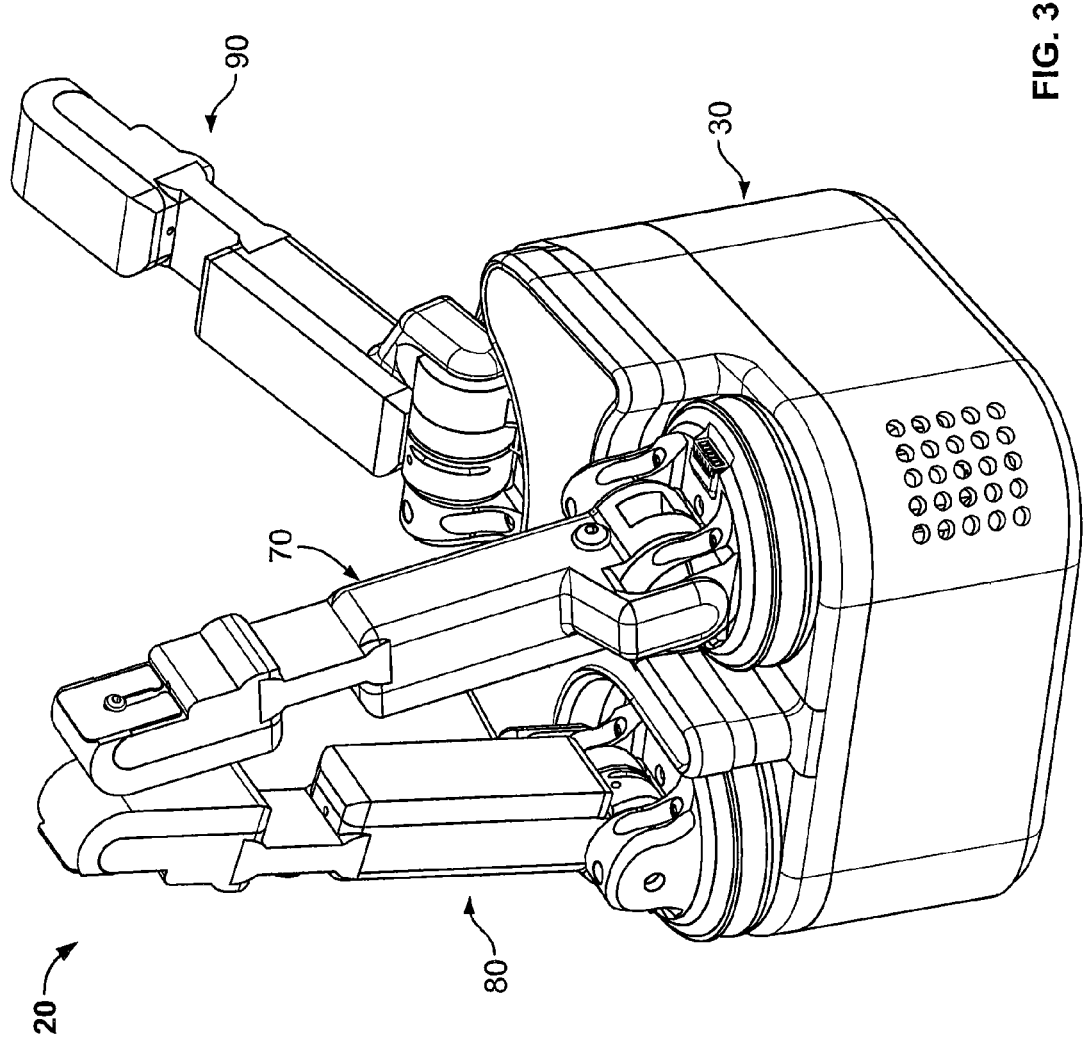
FIG. 3 is a rear perspective view of the grasper of FIG. 1.
Figure 24:
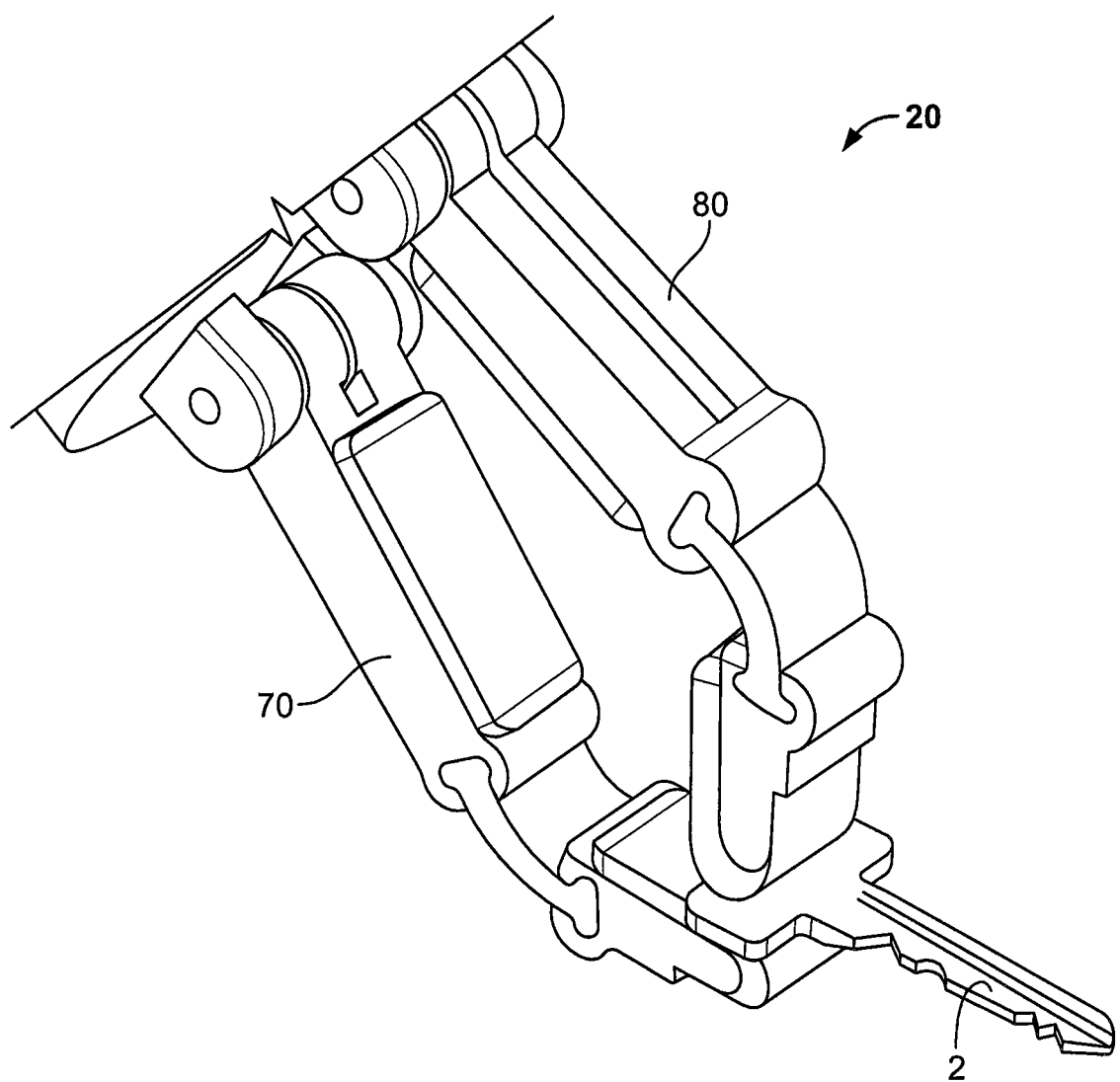

FIG. 1 shows the fingers 70, 80 in a pinch configuration, which can be achieved when the actuators 60, 62 pull the fingers 70, 80 (via the tendon cables 60A, 62A) closed without significant resistance. For this maneuver, the finger rotation actuator 68 may first be used to rotate the fingers 70, 80 into opposition with one another with their pivot axes FP-FP substantially parallel. FIG. 24 illustrates a modified pinch configuration being used to hold and/or manipulate an object 2 such as a flat key.

Figure 25:
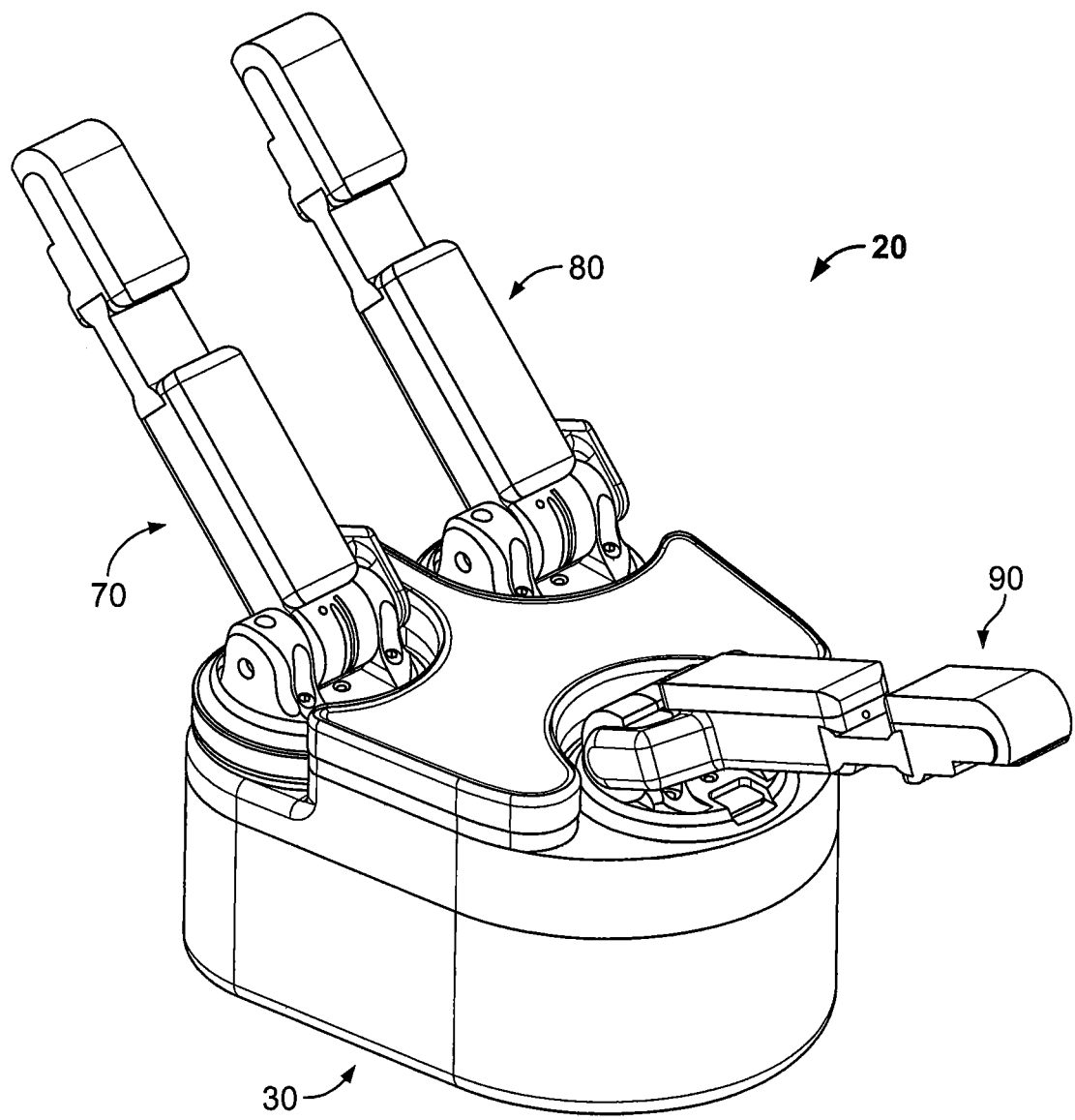
Figure 26:
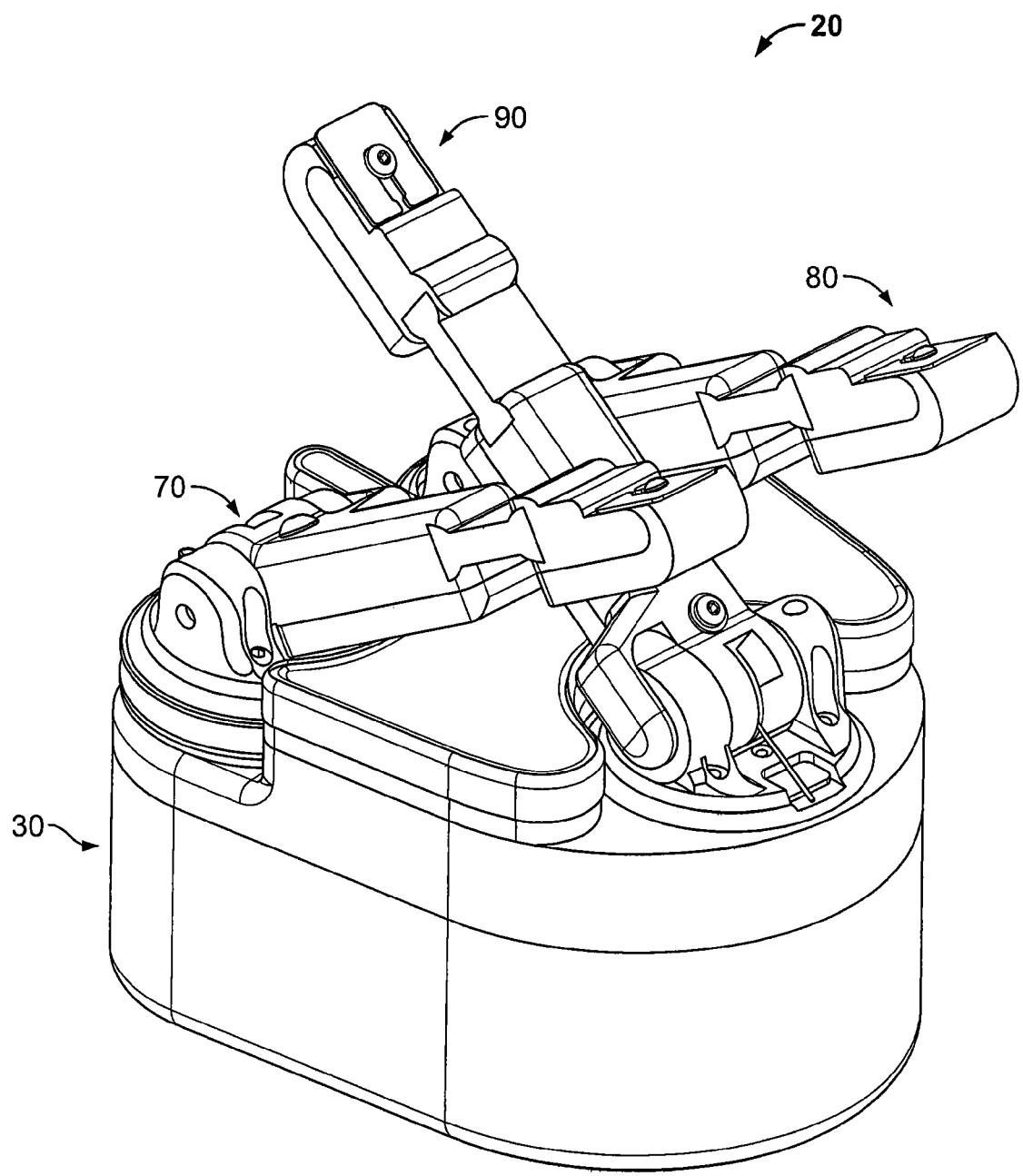
Figure 27:
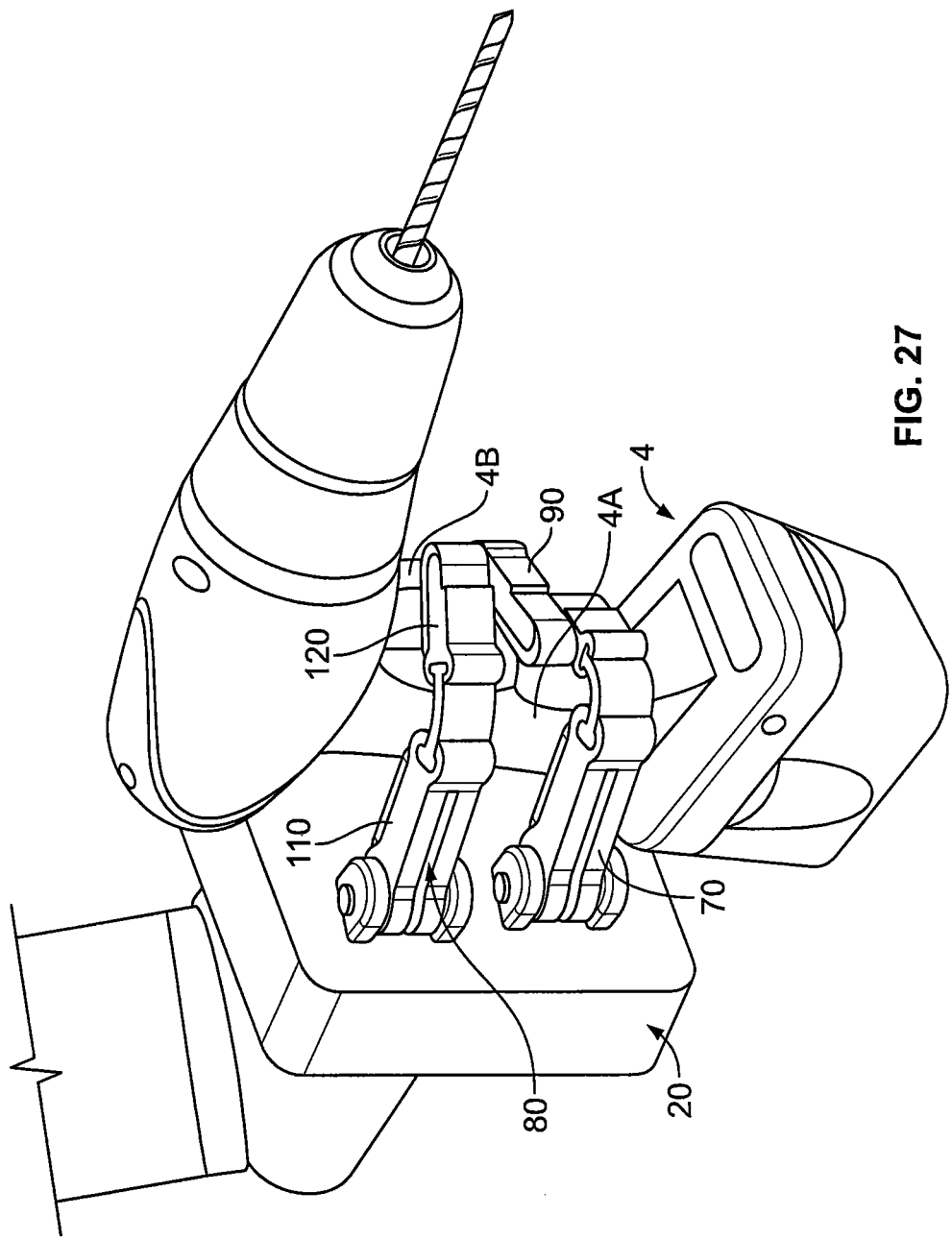

FIGS. 23, 25 and 26 show the fingers 70, 80, 90 progressing from the wide open configuration (FIG. 23) to a power grasp configuration (FIG. 26) wherein the thumb 90 crosses the fingers 70, 80. For this maneuver, the rotation actuator 68 may be used to rotate the fingers 70, 80 into opposition with the thumb 90 with the pivot axes FP-FP of the fingers 70, 80, 90 substantially parallel as shown in FIG. 25. FIG. 27 illustrates a modified power grasp configuration being used to hold and/or manipulate an object 4 such as a power tool. The exemplary power tool 4 has a handle 4A and a trigger 4B. The grasper 20 securely holds the handle 4A using the fingers 70, 80, 90, and can also be used to operate the trigger 4B by applying and releasing tension to/from the finger 80 via the tendon cable 62A so that its distal phalanx 120 will independently bend at the flexure joint JC and press and release the trigger 4B (the proximal phalanx 110 being limited or constrained by the handle 4A).

Figure 28:
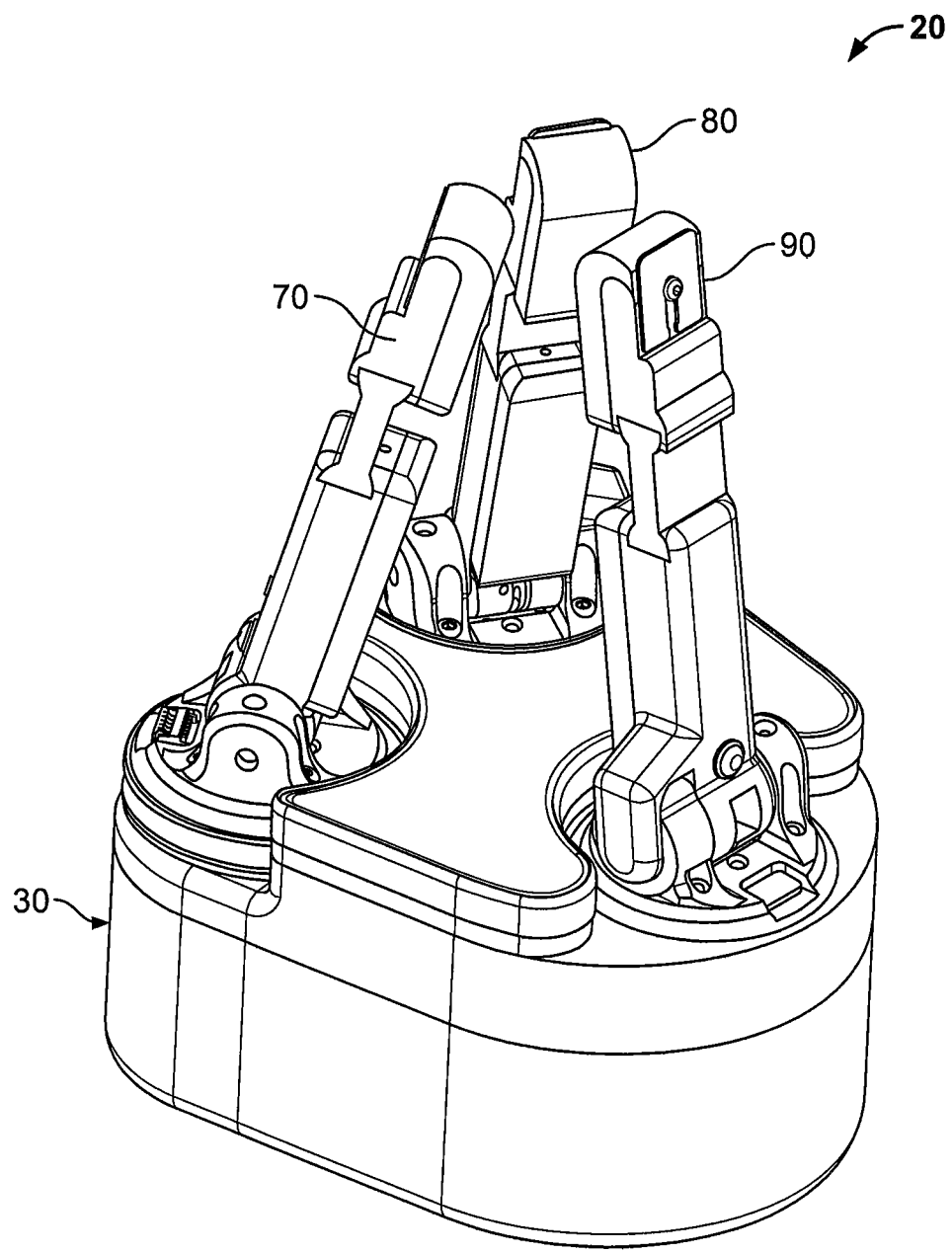
Figure 29:
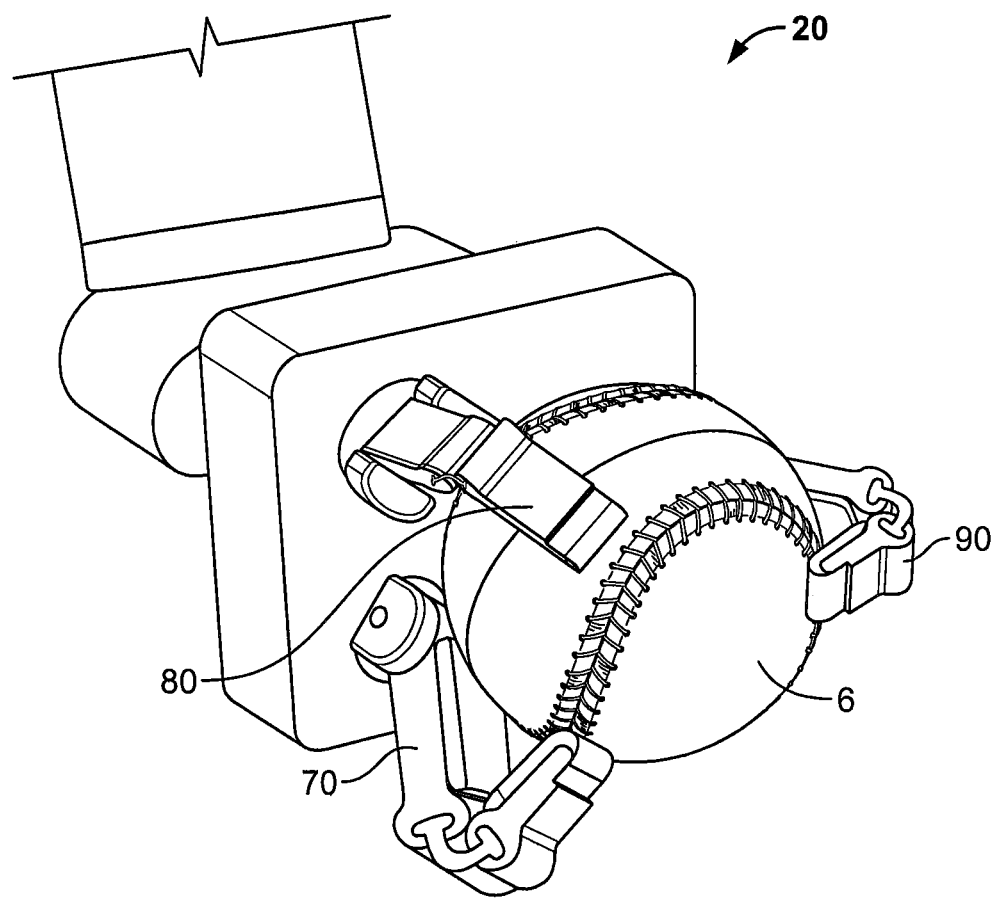

FIG. 28 shows the fingers 70, 80, 90 in a spherical grasp position. For this maneuver, the fingers 70, 80 are rotated so that their pivot axes FP-FP extend at an oblique angle to the pivot axis FP-FP of the thumb 90. FIG. 29 illustrates a modified spherical grasp position wherein the grasper 20 is holding an object 6 such as a ball.

It will be appreciated that the foregoing are not exhaustive of the configurations and manipulations that can be achieved using the grasper 20.

The relationships between the lengths of the phalanges 110 and 120 and the finger and thumb base positions can provide advantageous performance. In some embodiments, these relationships are scalable.

According to some embodiments, the length L1 (FIG. 13) of the proximal phalanx 110 of each finger 70, 80 is greater than the length L2 of the distal phalanx 120 of the same finger. According to some embodiments, the length L1 is in the range of from about 0.60 to 0.66 times the length L2.

Figure 6:
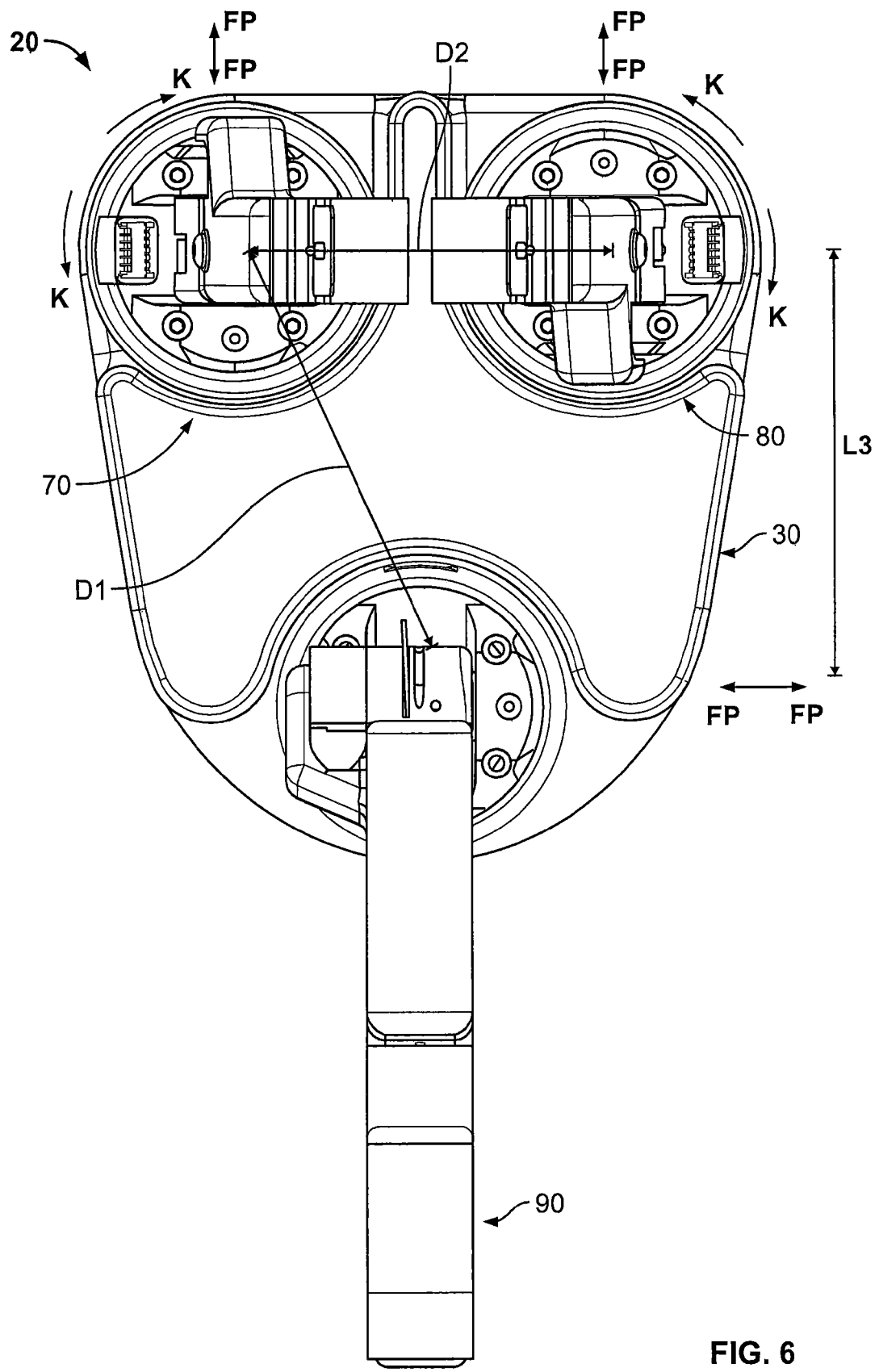
FIG. 6 is a top plan view of the grasper of FIG. 1.

In some embodiments, the average distance D1 (FIG. 6) from each finger 70, 80 base pivot joint JP to the thumb 90 pivot joint JP is in the range of from about 1.30 to 1.44 times the average proximal phalanx length L1.

According to some embodiments, the major dimension L3 (FIG. 6) of the palm 34 is in the range of from about 1.21 to 1.33 times the average proximal phalanx length L1.

In some embodiments, the spacing D2 (FIG. 6) between the pivot joints JP of the fingers 70, 80 is in the range of from about 0.97 to 1.08 times the average proximal phalanx length L1.

The provision of fingers each having a proximal pin pivot joint and a distal flexure joint as described may provide certain advantages. The rigid pivot at the base of the finger provides pinch stability and torsional strength to facilitate fine manipulation and heavy lifting. The flexure joint at the distal joint provides robustness for abuse and enhances the ability of the finger to adapt or conform to unknown shaped objects. According to some embodiments and as shown, the pin pivot axis FP-FP of each finger is substantially parallel to the primary flexure axis FB-FB of the finger.

With reference to FIGS. 9-12, according to some embodiments, the grasper 20 is provided with a fingernail system 141. The fingernail system 141 includes a distal plate member 140 mounted on the distal phalanx 120 of each finger 70, 80, 90 adjacent the distal end face 124A thereof. Only one of the fingers 70 will be described hereinbelow. However, it will be appreciated that this description applies likewise to the fingers 80 and 90.

The distal plate member 140 includes a base portion 144 and a free terminal lifting edge 142A. The base portion 144 has a slot 144A and is adjustably secured to the back face 124C of the phalanx 120 by a fastener 144B such as a screw. The free edge 142A is located adjacent the end face 124A. In some cases, and as shown, the distal plate member 140 has an extension portion 142 terminating in the free edge 142A and overhanging (cantilevered) or extending axially beyond the location 147 where the plate member 140 diverges from the phalanx 120 to form a ledge. However, in other embodiments, the free edge 142A can be coincident with or inboard of the location 147.

In some embodiments, the fastener 144B and groove 144A can serve as an adjustment mechanism. More particularly, the fastener 144B can be loosened, the plate member 140 slid to position the edge 142A as desired relative to the end face 124A, and the fastener 144B then re-tightened to secure the plate member 140 in place. It will be appreciated that other suitable adjustment mechanisms can be employed.

The plate member 142 is relatively thin, at least in the region of the free edge 142A. According to some embodiments, the free edge 142A has a thickness T1 (FIG. 12) in the range of from about 0.02 inch to 0.03 inch. In some embodiments, the length L4 of the extension portion 142 from the location 147 to the free edge 142A is at least 1 mm and, in some embodiments, from about 1.5 mm to 2.5 mm. According to some embodiments, the free edge 142A is substantially parallel to the flexure joint axis FB-FB.

According to some embodiments and as shown, the end face 124A and the plate member 140 are relatively configured and arranged to define a laterally extending slot, groove or undercut 146 between the underside of the extension section 142 and the opposing surface of the end face 124A. In some embodiments and as shown, the end face 124A is shaped to cut back axially to form the undercut 146. In some embodiments, the end face 124A is rounded or curvilinear and, in some embodiments, arcuate in cross-section (i.e., in a plane perpendicular to the plane E and parallel to the longitudinal axis of the distal phalanx 120).

According to some embodiments, the depth D3 of the undercut 146 is in the range of from about 1 mm to 3 mm. According to some embodiments, the width W1 of the undercut 146 is in the range of from about 10 mm to 25 mm.

In some embodiments, the plate member 140 is rigid (e.g., formed of steel or stainless steel) and the end face 124A is relatively soft or compliant (e.g., formed of a pliable rubber). As shown, the distal phalanx 120 includes a soft pad 125 including the end face 124A. In some embodiments, the pad 125 has a durometer in the range of from about 0 Shore A to 60 Shore A and, in some embodiments, from about 10 Shore A to 40 Shore A, and the plate member 140 has a stiffness of at least about 100 GPa and, in some embodiments, at least 180 GPa.

The plate member 140 can be used to pick up, engage and/or manipulate objects in a manner not possible or that would be cumbersome without the "fingernail". The combination of the thin, rigid plate member 140 ("fingernail") and the pliable, soft pad 125 ("fingertip") enables the finger to capture an edge of an object therebetween (i.e., in the undercut 146). For example, if an object is disposed on a support surface (e.g., a table surface), the plate member 140 can be pressed against the support surface, then translated under the object (between the object and the support surface), and then used to lift the object. The compliant flexure joint JC compliments the functionality of the fingernail system 141. The joint compliance enables the plate member 140 to adaptively align with and maintain contact with the support surface.

Figure 30A:
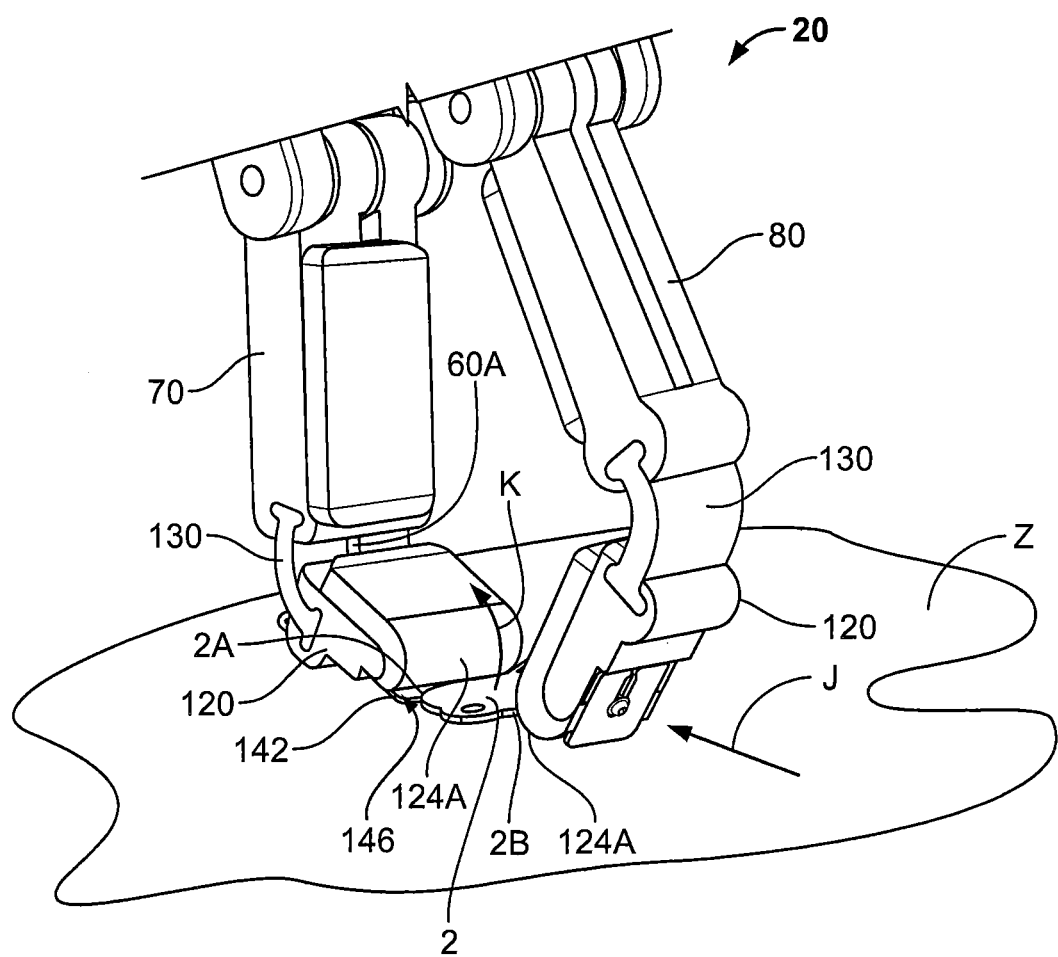
FIGS. 30A and 30B illustrate a sequence of movements of the grasper of FIG. 1 to grab and pick up an object.
Figure 30B:
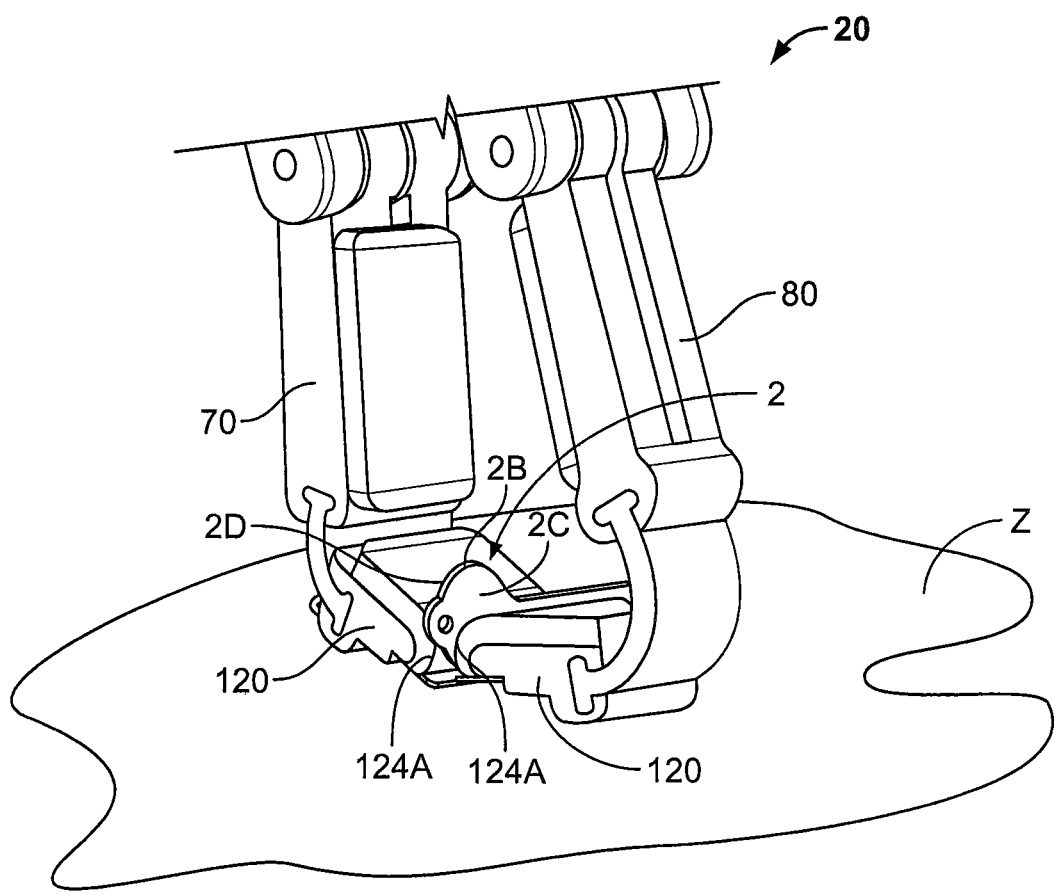

With reference to FIGS. 30A and 30B, the grasper 20 is shown therein performing a sequence of steps or movements to grasp and pick up an object 2 (as shown, a relatively flat key) from a planar surface Z (e.g., a table or floor).

Initially, the key 2 is laid flat on the surface Z. With reference to FIG. 30A, the grasper 20 is positioned such that the extension section 142 of the plate member 140 of the finger 70 is placed on the surface Z proximate the side edge 2A of the key 2 with the undercut 146 and the soft pad 125 overlying the extension section 142. The phalanx 120 of the finger 80 is placed against the surface Z and driven in a direction J toward the key 2 and the finger 70, the fingers 70 and 80 being relatively disposed in a pinching configuration. As the finger 80 is driven in the direction J, it engages the side edge 2B of the key 2 and pushes the side edge 2A onto the plate member 140 (in some embodiments, into the undercut 146 and between the extension section 142 and the soft pad 125). The phalanx 120 of the finger 80 is further driven toward the finger 70 and upward to lift the side edge 2B off the surface Z. The key 2 is thereby flipped or pivoted upwardly about its edge 2A and toward the end face 124A of the finger 70 in a direction K as shown in FIG. 30A, the edge 2A being captured between the plate member 140 and the pad 125. With reference to FIG. 30B, the finger 80 is used to continue lifting the key 2 and converged with the finger 70 until the key 2 is sandwiched between the end faces 124A of the fingers 70 and 80, which engage the opposed faces 2D and 2C, respectively, of the key 2.

A relatively flat object such as a key (or credit card, etc.) can thus be grasped, removed from a planar surface and manipulated using the "fingernail" or fingernails" of the grasper 20 and cooperative movement of the fingers 70, 80 (and, in some embodiments, the base 30 and/or the arm 12).

In some embodiments and as shown, the axially extending front side edges 126A of the distal phalanx 120 are sharp or distinct and the front face 124B (i.e., the contact or engagement face) is substantially flat or planar (FIGS. 9 and 10). According to some embodiments, the side walls of the distal phalanx 120 forming the side edges 126A with the front face 124B are substantially planar at and adjacent the front face 124B and, in some embodiments, extend substantially perpendicular to the plane of the front face 124B. The front face 124B may be textured. As shown, these edges 126A and the front face 124B can be the edges and front face of the soft pad 125. In some embodiments, the plane of the front face 124B is substantially parallel to the pivot pin axis FP-FP and the flexure joint primary axis FB-FB.

In use, the described configuration assists in stabilizing the distal phalanges 120. For example, when the fingers 70, 80 are used to pinch an object between the distal phalanges 120, the sharp side edges 126A and the planar front face 124B can reduce or eliminate the tendency of the distal phalanges 120 to be twisted about their flexure joints JC. The sharp edges 124A can also assist in making firm and precise engagement with an object.

In some embodiments, the distal phalanx 120 is prismatic and has a substantially rectangular cross-section. In some embodiments, the proximal phalanx 110 is also prismatic and has a substantially rectangular cross-section.

With reference to FIGS. 15-22, the grasper 20 may also be provided with a magnetic breakaway system or mechanism 150 coupling each of the fingers 70, 80, 90 to the base 30. The breakaway features for each of the fingers 70, 80, 90 may be substantially the same or similar and therefore the description below with regard to the finger 70 likewise applies to the fingers 80 and 90.

The magnetic breakaway system 150 includes the finger base submount 40 and the magnet base submount 160. A magnet 166 is fixed in the submount 160 and a ferromagnetic member or plate 156 (e.g., formed of steel) is affixed in the submount 40. A magnetic field concentrator 153 may be provided in the submount 160.

The submount 40 has a circumferentially extending locator flange 152 defining a rotational alignment slot 154 therein. The submount 160 has a circumferentially extending, semi-annular locator groove 162 having a rotational alignment tab 164 therein. The locator flange 152 is seated in the locator groove 162 such that the tab 164 is seated in the slot 154. The tendon cable 60A extends through axial tendon raceways 158 and 168 defined in the submounts 40 and 160, respectively. Likewise, in the case of the finger 80, the tendon cable 62A extends through the raceways 158 and 168. In the case of the thumb 90, the tendon cables 64A and 66A extend through respective ones of the axially extending raceways 158 and 168.

Figure 22:
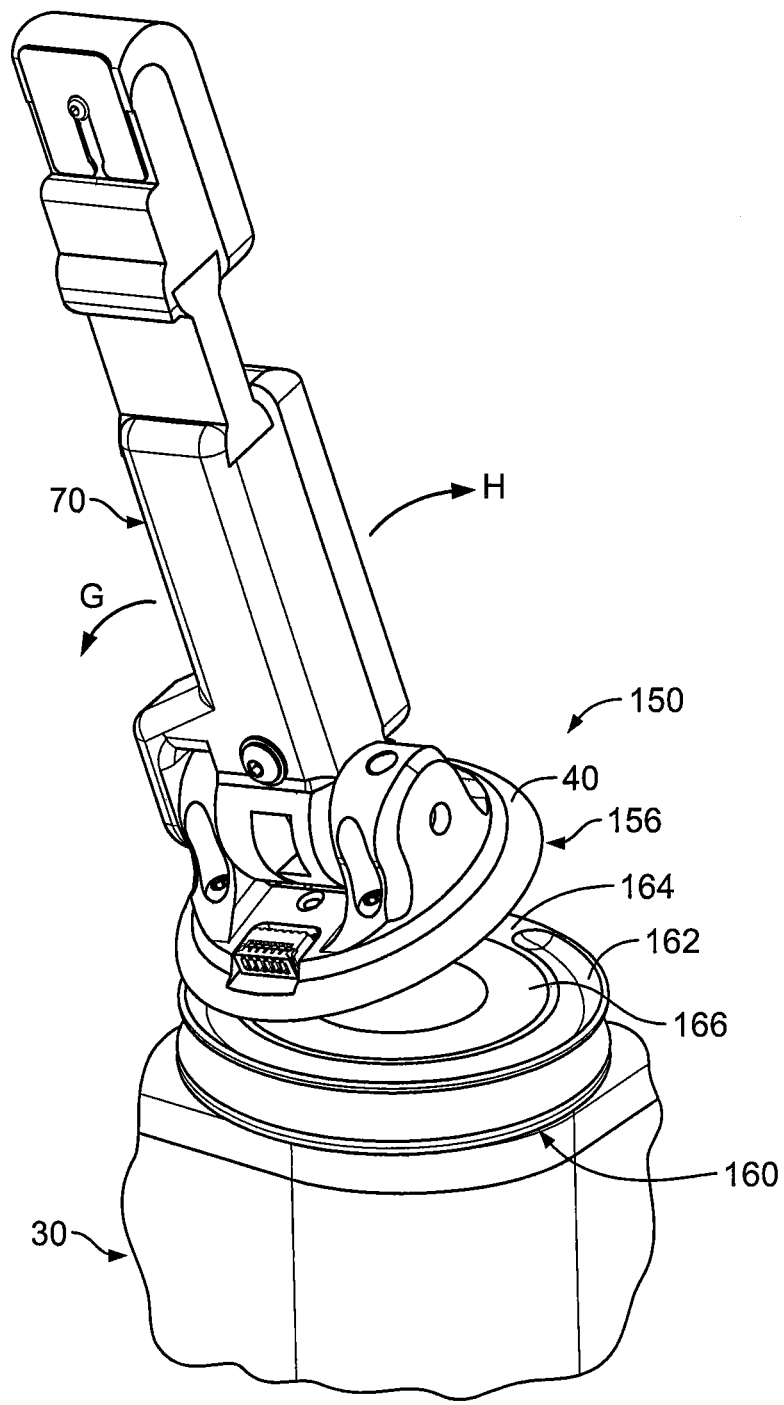
FIG. 22 is a fragmentary, perspective view of the finger and magnetic breakaway system of FIG. 15 illustrating operation of the magnetic breakaway system.

In use, the magnetic breakaway system 150 can serve to decouple the fingers 70, 80, 90 from the base 30 to prevent or reduce the risk of damage to the finger or joint. When a load on a finger exceeds a prescribed threshold load, the magnetic attraction between the components 156 and 166 is overcome and the submount 40 separates (partially or fully) from the submount 160. For example, the finger 70 and its submount 40 may be deflected away from the cooperating submount 160 in a deflection direction G as shown in FIG. 22. When the load on the finger is relieved (e.g., by removing an object or operating the associated actuator to pay out the tendon cable), the magnetic attraction or tension in the tendon cable will again draw the submounts 40 and 160 together. For example, the finger 70 and its submount 40 may return or pivot back onto the cooperating submount 160 in a return direction H as shown in FIG. 22. The pull force of the tendon through the raceways 158, 168 will tend to draw the submounts 40, 160 into coaxial alignment. In the case of a small breakaway deflection of the submount 40 from the submount 160, the shapes of the locator features 152, 154, 162, 164 may automatically guide the submounts 40 and 160 back into rotational alignment, whereupon the submounts 40 and 160 will again interlock. Applying additional tension to the tendon cable may also rotate the submounts 40 and 160 into rotational alignment. In some cases, the submounts 40 and 160 can be rotationally aligned by rotating the submount 160 using the actuator 68. The submount 160 will slidably rotate relative to the corresponding submount 40 until their locator features align, whereupon the submounts 40 and 160 will nest and interlock. In some cases, it may be necessary to manually realign and reseat the submounts 40 and 160.

In some embodiments, the magnetic breakaway system 150 does not compromise the capability of the grasper 20 to lift heavy objects. Because the tendon cable or cables run axially through both of the submounts 40, 160 and substantially perpendicular to the face of the magnet 166, the tendon cables pull the submounts 40, 160 together. Typically, the submounts 40 and 160 will only be dislodged by twisting force on the fingers.

As mentioned above and as shown in FIG. 5, the thumb 90 is provided with two independent tendon cables 64A and 66A connected to corresponding actuators 64 and 66. The tendon cable 64A may be regarded as an agonist tendon and the tendon cable 66A may be regarded as an antagonist tendon.

The tendon cable 64A is routed to and anchored to the distal phalanx 120 of the thumb 90 in the same manner as described above. The tendon cable 66A is routed through the outer raceways 158, 168, over the hinge feature 42, and anchored to the back side of the proximal phalanx 110 by a screw 43.

In addition to being operable in the same manner as described above for the fingers 70, 80 using the tendon cable 64A, the tendon cables 64A and 66A can be used together to control movement of the distal phalanx 120 of the thumb 90 independently of its proximal phalanx 110. More particularly, the tendon cable 66A can be used to hold the proximal phalanx 110 in place, effectively stalling the proximal phalanx 110 against further rotation in the closing direction F, while the actuator 64 draws on the tendon cable 64A. Because the proximal phalanx 110 is held in place, the distal phalanx 120 is independently bent at the flexure joint JC in the direction M without simultaneous pivoting of the proximal phalanx 110 in the closing direction F. The tendon cable 66A can be extended to permit the distal phalanx 120 to elastically bend back in the direction N about the flexure joint JC.

According to some embodiments, the tendon cables 60A, 62A, 64A, 66A are capable of transmitting sustained tensile loads in the range of from about 60 to 120 lbf, exhibit low energy storage upon bending, and are robust to bend radii less than one millimeter.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A compliant underactuated grasper comprising:
   a palm base;
   first and second fingers, wherein each of the first and second fingers comprises:
      a proximal phalanx;
      a distal phalanx; and
      a compliant flexure joint connecting the distal phalanx to the proximal phalanx; and
   first and second rotation joints connecting the first and second fingers, respectively, to the palm base to enable rotation of the first and second fingers relative to the palm base, wherein the first and second fingers can be rotated relative to the palm base about the first and second rotation joints to reorient the first and second fingers with respect to the palm base and to change an angle defined between a pivot axis of the first finger and a pivot axis of the second finger;
   wherein the distal phalanx of each of the first and second fingers includes:
      a rounded end face; and
      a lifting portion including a lifting edge adjacent the rounded end face;
   wherein each of the first and second fingers further includes a tendon cable for moving the proximal and distal phalanges such that movement of the tendon cable generates angular motion of the proximal phalanx about the pivot axis of the finger at a greater rate than angular motion of the distal phalanx about the flexure joint; and
   wherein, with respect to each of the first and second fingers:
      the proximal phalanx is connected to the palm base for rotation about the pivot axis in a first direction and a second direction;
      the grasper includes a return biasing spring to drive the proximal phalanx in the second direction to a return position;
      the return biasing spring has a first spring rate;
      the flexure joint is configured to bias the distal phalanx into an open position relative to the proximal phalanx and has a second spring rate; and
      the second spring rate is greater than the first spring rate.

2. The grasper of claim 1 wherein:
   the first rotation joint enables rotation of the first finger about a first rotation axis;
   the second rotation joint enables rotation of the second finger about a second rotation axis; and
   the first and second rotation axes are substantially parallel.

3. The grasper of claim 1 including at least one finger rotation actuator operable to forcibly rotate the first and second fingers about the first and second rotation joints.

4. The grasper of claim 1 wherein the first and second fingers are linked such that the first and second fingers rotate about the first and second rotation joints in tandem in opposite rotational directions from one another.

5. The grasper of claim 4 including at least one finger rotation actuator to forcibly rotate the linked first and second fingers in tandem in opposite rotational directions from one another.

6. The grasper of claim 1 including at least one actuator to move the first and second fingers, and wherein the grasper has fewer actuators than degrees of freedom.

7. The grasper of claim 1 further including:
   a thumb including:
      a proximal phalanx;
      a distal phalanx;
      a compliant flexure joint connecting the distal phalanx to the proximal phalanx; and
      a joint connecting the proximal phalanx to the palm base; and
   at least one actuator to move the thumb independently of the first and second fingers.

8. The grasper of claim 1 wherein the flexure joint of each of the first and second fingers includes a flexure link formed of a compliant elastomeric material.

9. The grasper of claim 1 wherein the second spring rate is at least eight times the first spring rate.

10. The grasper of claim 1 wherein:
    the first spring rate is sufficient to retain the proximal phalanx in the return position in any orientation of the grasper with the tendon cable slack; and
    the second spring rate is sufficient to retain the distal phalanx in the open position in any orientation of the grasper with the tendon cable slack.

11. The grasper of claim 1 wherein, with respect to each of the first and second fingers:
    the tendon cable can move the proximal phalanx in the first direction; and
    the first spring rate of the return biasing spring is sufficient to retain the proximal phalanx in the return position in any orientation of the grasper with the tendon cable slack.

12. The grasper of claim 11 wherein the return biasing spring includes a torsion spring.

13. The grasper of claim 1 wherein the lifting edge has a thickness in the range of from about 0.02 inch to 0.03 inch.

14. The grasper of claim 1 wherein:
    the lifting edge is a free terminal edge; and
    the distal phalanx includes a lifting groove defined between the rounded end face and the lifting edge.

15. The grasper of claim 14 wherein the rounded end face defines an arc in a plane substantially perpendicular to a longitudinal axis of the lifting groove.

16. The grasper of claim 1 wherein the rounded end face has an arcuate shape, and wherein the shape of the rounded end face defines an undercut adjacent the lifting portion such that a lifting groove is defined between the undercut and an underside of the lifting portion.

17. The grasper of claim 16 wherein the lifting groove has a depth in the range of from about 1 mm to 3 mm.

18. The grasper of claim 1 wherein the rounded end face is formed of a softer material than the lifting portion.

19. The grasper of claim 18 wherein:
the softer material of the rounded end face has a hardness in the range of from about 0 Shore A to 60 Shore A; and
the lifting portion has a hardness of at least about 100 GPa.

20. The grasper of claim 1 wherein the distal phalanx has a substantially planar inner grasping face and distinct, opposed, axially extending inner side edges.

21. A compliant underactuated grasper comprising:
a palm base;
first and second fingers, wherein each of the first and second fingers comprises:
  a proximal phalanx;
  a distal phalanx; and
  a compliant flexure joint connecting the distal phalanx to the proximal phalanx; and
first and second rotation joints connecting the first and second fingers, respectively, to the palm base to enable rotation of the first and second fingers relative to the palm base, wherein the first and second fingers can be rotated relative to the palm base about the first and second rotation joints to reorient the first and second fingers with respect to the palm base and to change an angle defined between a pivot axis of the first finger and a pivot axis of the second finger;
wherein the distal phalanx of each of the first and second fingers includes:
  a rounded end face; and
  a lifting portion including a lifting edge adjacent the rounded end face; and
wherein, with respect to each of the first and second fingers:
  the proximal phalanx is connected to the palm base for rotation about the pivot axis in a first direction and a second direction;
  the finger includes a tendon cable for moving the proximal phalanx in the first direction; and
  the grasper includes a return biasing spring to drive the proximal phalanx in the second direction to a return position, wherein the spring rate of the return biasing spring is sufficient to retain the proximal phalanx in the return position in any orientation of the grasper with the tendon cable slack.

22. The grasper of claim 21 wherein the return biasing spring includes a torsion spring.

* * * * *